US008988900B2

(12) United States Patent
Toliyat et al.

(10) Patent No.: US 8,988,900 B2
(45) Date of Patent: Mar. 24, 2015

(54) DC CAPACITOR-LESS POWER CONVERTERS

(75) Inventors: Hamid A. Toliyat, College Station, TX (US); Mahshid Amirabadi, College Station, TX (US)

(73) Assignee: Texas A&M University System, College Station, TX (US)

( * ) Notice: Subject to any disclaimer, the term of this patent is extended or adjusted under 35 U.S.C. 154(b) by 354 days.

(21) Appl. No.: 13/486,627

(22) Filed: Jun. 1, 2012

(65) Prior Publication Data

US 2012/0307531 A1 Dec. 6, 2012

Related U.S. Application Data

(60) Provisional application No. 61/493,210, filed on Jun. 3, 2011.

(51) Int. Cl.
*H02M 3/335* (2006.01)
*H02M 5/458* (2006.01)

(52) U.S. Cl.
CPC ............ *H02M 5/4585* (2013.01); *Y02B 70/145* (2013.01)
USPC ............................................. 363/17; 363/34

(58) Field of Classification Search
USPC ............... 363/13, 16–20, 34, 37, 39, 41, 123, 363/124; 323/222, 224, 226, 239
See application file for complete search history.

(56) References Cited

U.S. PATENT DOCUMENTS

| 4,096,557 | A | 6/1978 | Schwarz |
| 4,523,269 | A | 6/1985 | Baker et al. |
| 4,638,138 | A | 1/1987 | Rosa et al. |
| 4,730,242 | A | 3/1988 | Divan |
| 4,833,584 | A | 5/1989 | Divan |
| 4,897,775 | A | 1/1990 | Klaassens |
| 4,942,511 | A | 7/1990 | Lipo et al. |
| 5,010,471 | A | 4/1991 | Klaassens et al. |
| 5,270,914 | A | 12/1993 | Lauw et al. |
| 5,559,685 | A | 9/1996 | Lauw et al. |

(Continued)

OTHER PUBLICATIONS

Anand Balakrishnan, Hamida. Toliyat and William C. Alexander, "Soft Switched Ac Link Buck Boost Converter," 2008, IEEE pp. 1334-1339.
Hamid A. Toliyat, Anand Balakrishnan, Mahshid Amirabadi and William Alexander, "Soft Switch AC-Link AC/AC and AC/DC Buck-Boost Converter," 2008, IEEE pp. 4168-4176.
Mahshid Amirabadi, Anand Balakrishnan, Hamid A. Toliyat and William Alexander, "Soft Switched AC-Link Direct-Connect Photovoltaic Inverter," 2008, IEEE pp. 116-120.

(Continued)

*Primary Examiner* — Rajnikant Patel
(74) *Attorney, Agent, or Firm* — Wong, Cabello, Lutsch, Rutherford & Brucculeri LLP

(57) ABSTRACT

Three resonance-based universal power converter topologies are disclosed. One includes a partially resonant parallel L-C link and incorporates intermediate cross-over switching circuits between the link stage and each of the input and output stages (which are constructed using unidirectional switches), thereby permitting the partially resonant circuit to be operated bi-directionally. A second includes a partially resonant series LC link in parallel with the input and output networks. A third includes a partially resonant series LC link in series between the input and output networks. The input and output networks can be formed from either bidirectional switches or a combination of unidirectional switches and intermediate cross-over switching circuits, permitting the partially resonant circuit to be operated bi-directionally. All embodiments permit the use of smaller reactive components in the link stage and the use of AC rather than DC capacitors, which reduces size and costs of the device while increasing the reliability.

23 Claims, 50 Drawing Sheets

(56) References Cited

U.S. PATENT DOCUMENTS

| | | | |
|---|---|---|---|
| 5,870,292 | A | 2/1999 | Lipo et al. |
| 6,091,615 | A * | 7/2000 | Inoshita et al. ............... 363/98 |
| 6,118,678 | A | 9/2000 | Limpaecher et al. |
| 6,141,228 | A * | 10/2000 | Maurio .................. 363/56.05 |
| 6,411,529 | B1 * | 6/2002 | Svensson ...................... 363/35 |
| 6,654,261 | B2 | 11/2003 | Welches et al. |
| 6,791,281 | B2 * | 9/2004 | Mita ........................... 315/224 |
| 7,142,439 | B2 * | 11/2006 | Oh ................................ 363/37 |
| 7,327,113 | B2 * | 2/2008 | Steigerwald et al. ......... 318/599 |
| 7,599,196 | B2 | 10/2009 | Alexander |
| 7,778,045 | B2 * | 8/2010 | Alexander .................... 363/13 |
| 2003/0160515 | A1 * | 8/2003 | Yu et al. ........................ 307/105 |
| 2006/0103341 | A1 | 5/2006 | Steigerwald et al. |
| 2008/0013351 | A1 | 1/2008 | Alexander |
| 2012/0033464 | A1 | 2/2012 | Alexander |

OTHER PUBLICATIONS

Anand Balakrishnan, Mahshid Amirabadi, Hamid A. Toliyat and William Alexander, "Soft Switched AC-Link Wind Power Converter," 2008, IEEE pp. 318-321.

Mahshid Amirabadi, Hamid A. Toliyat and William C. Alexander, "Battery-Utility Interface using Soft Switched AC Link Buck Boost Converter," 2009, IEEE pp. 1299-1304.

Mahshid Amirabadi, Hamid A. Toliyat and William C. Alexander, "Battery-Utility Interface using Soft Switched AC Link supporting Low Voltage Ride Through," 2009, IEEE pp. 2606-2613.

Mahshid Amirabadi, Hamid A. Toliyat and William C. Alexander, "A Multi-input ac Link PV Inverter with Reduced Size and Weight," 2012, IEEE pp. 389-396.

Thomas A. Lipo, "Recent Progress in the Development" IEEE Transactions on Power Electronics, vol. 3, No. 2, pp. 105-117, Apr. 1988.

* cited by examiner

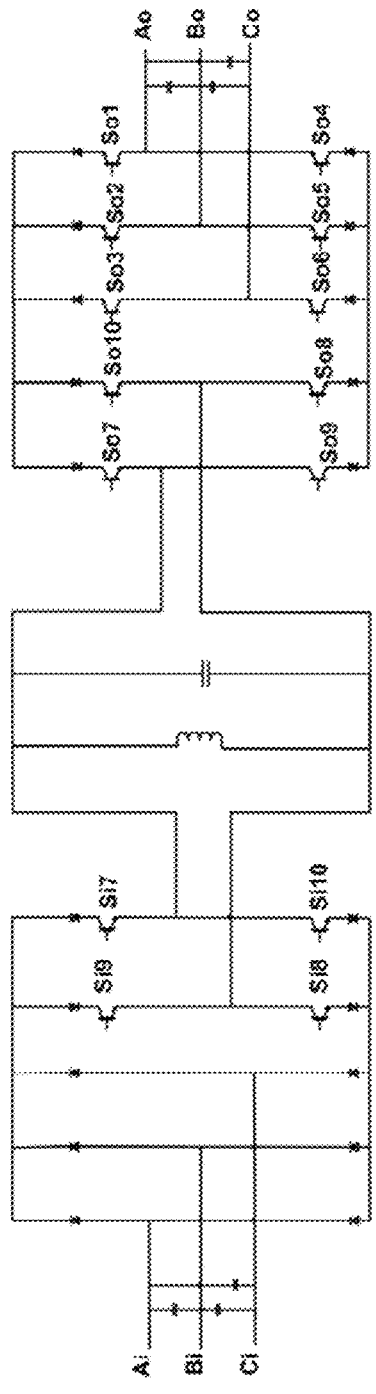
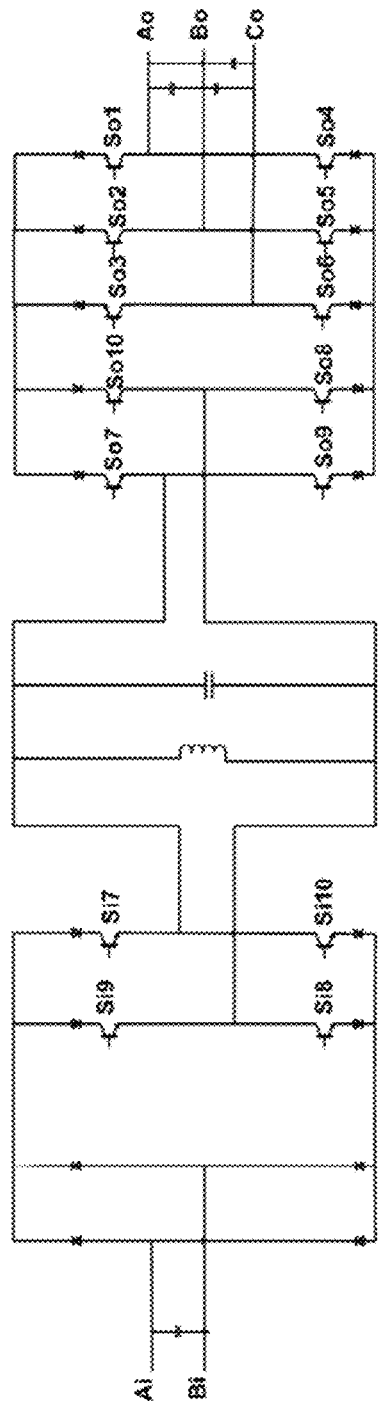
Fig. 5
Fig. 6

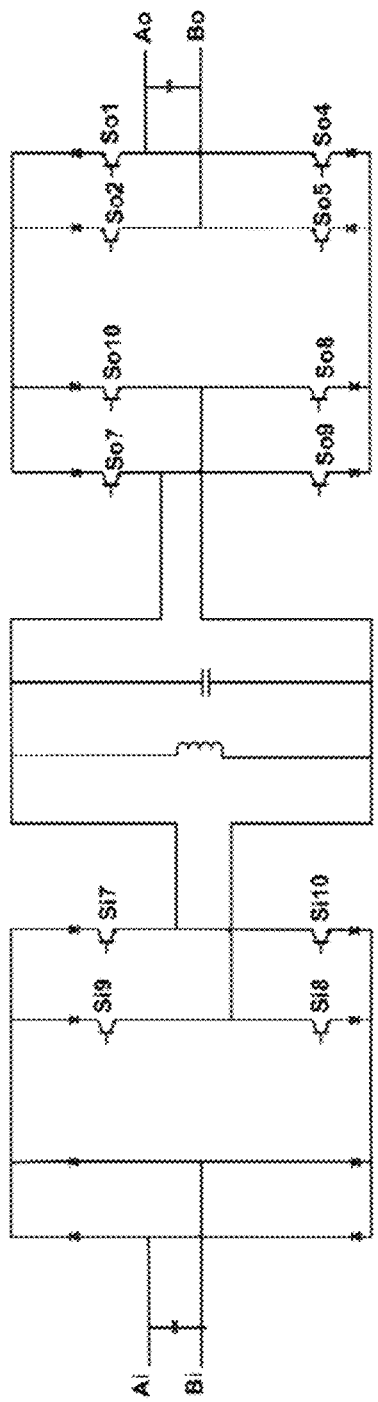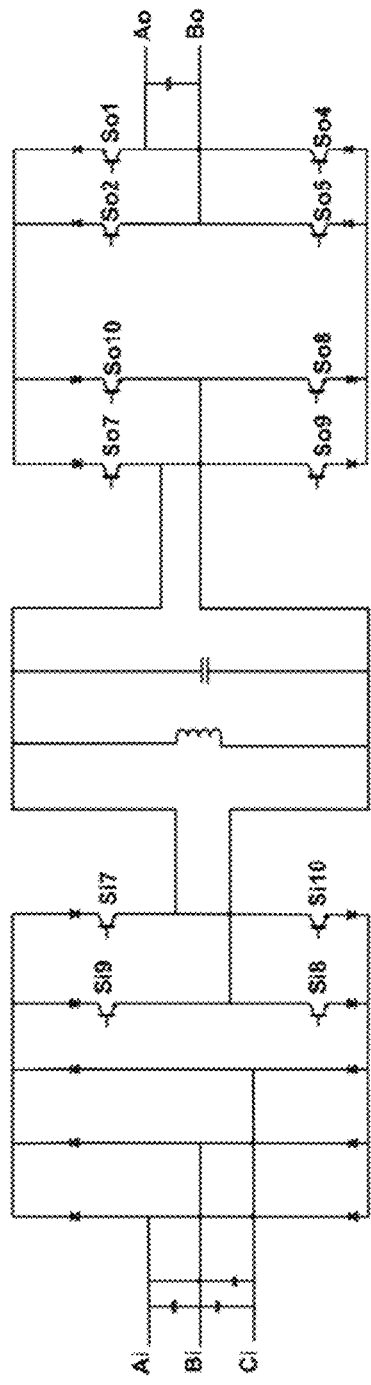
Fig. 7
Fig. 8

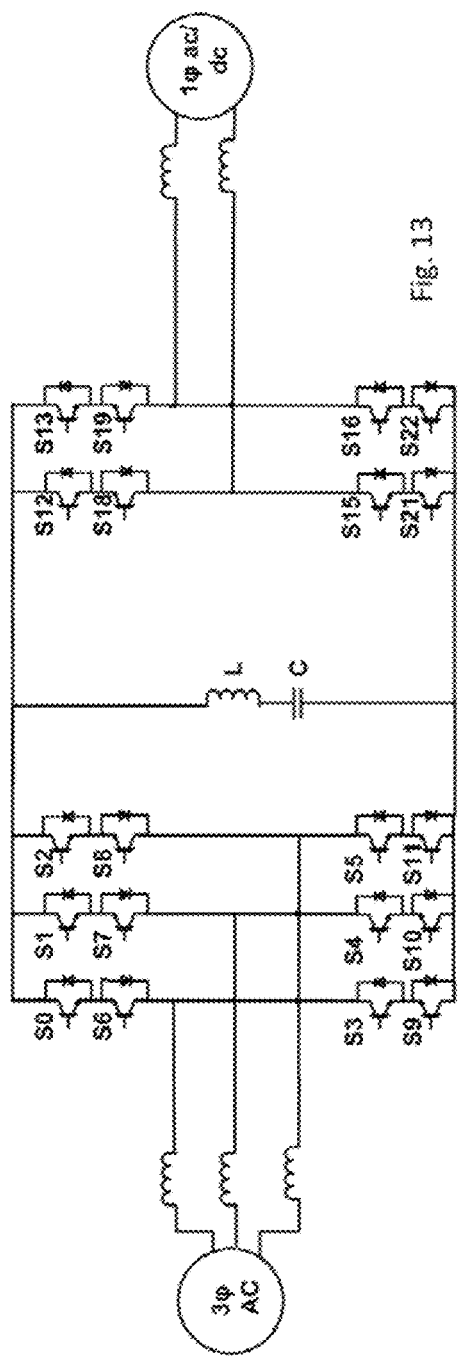
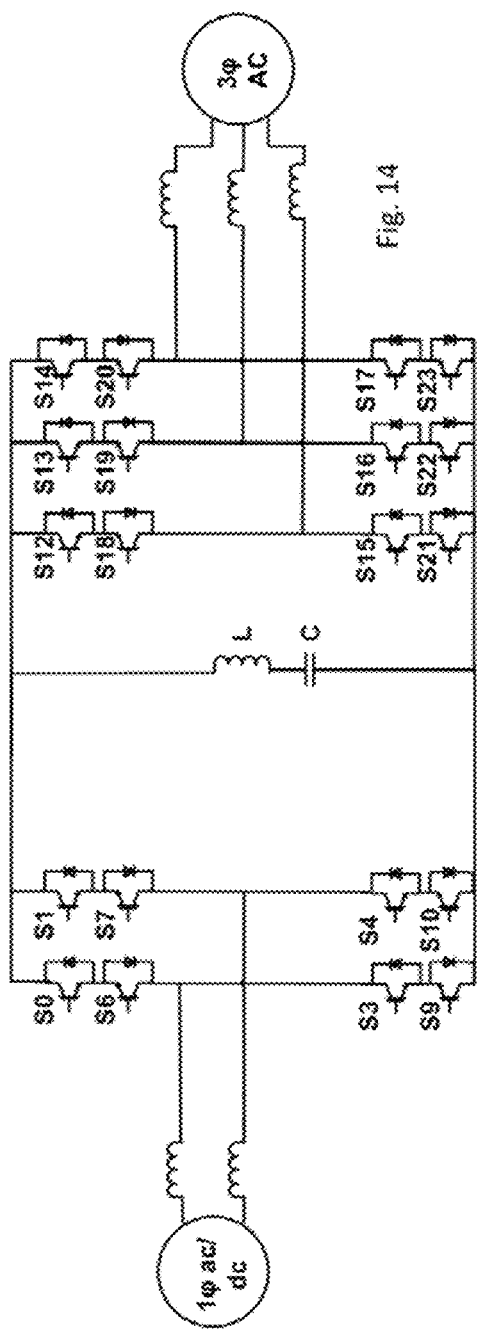

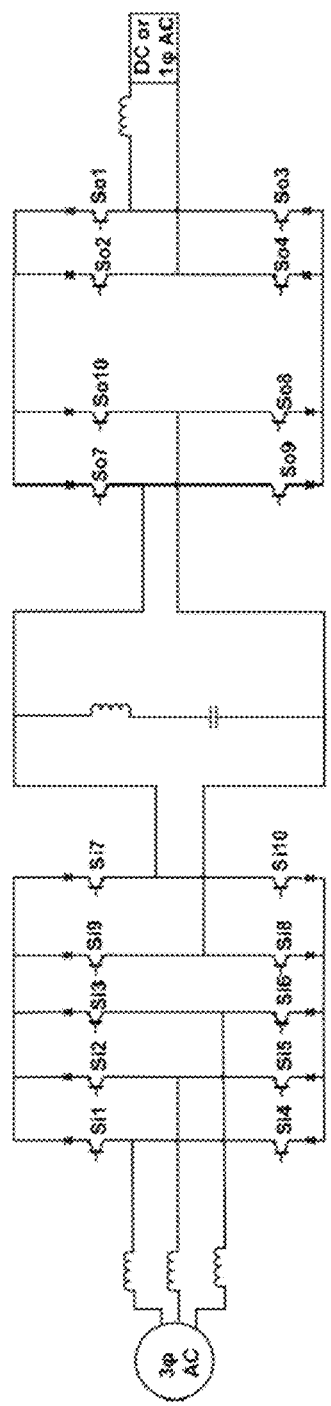
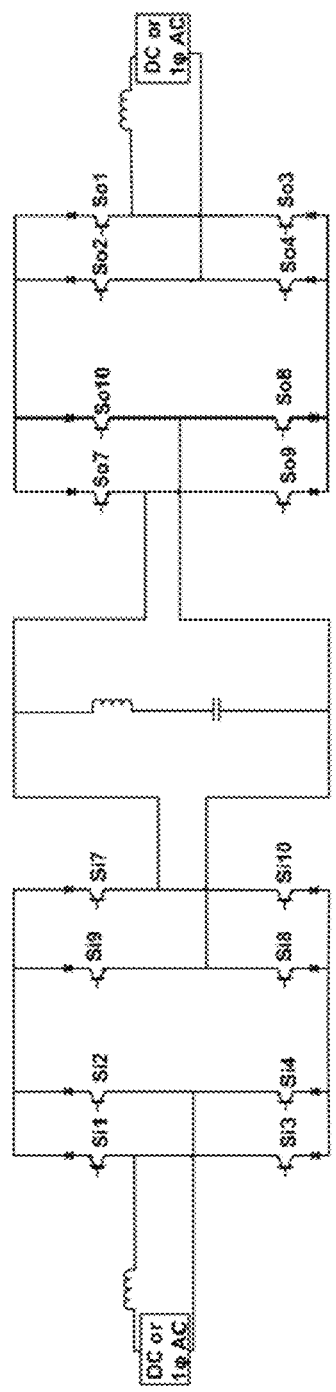
Fig. 17
Fig. 18

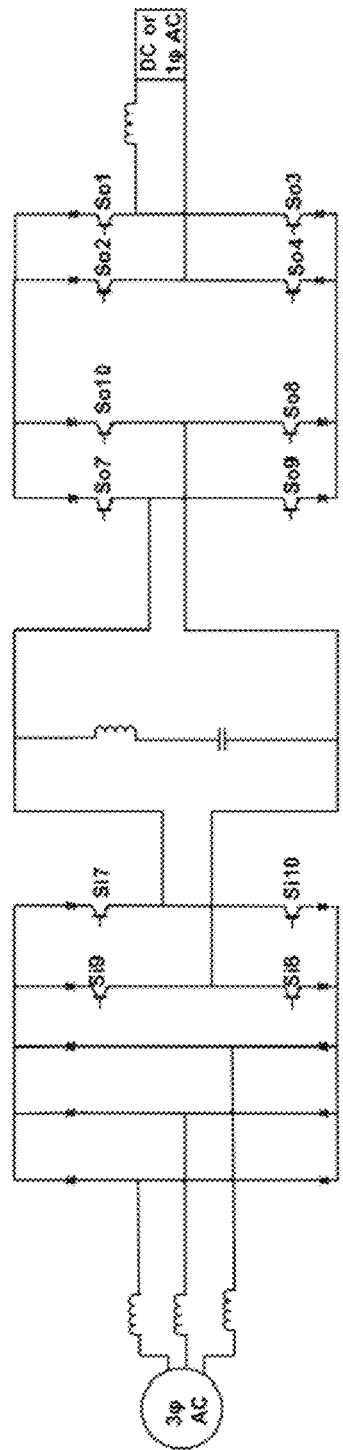
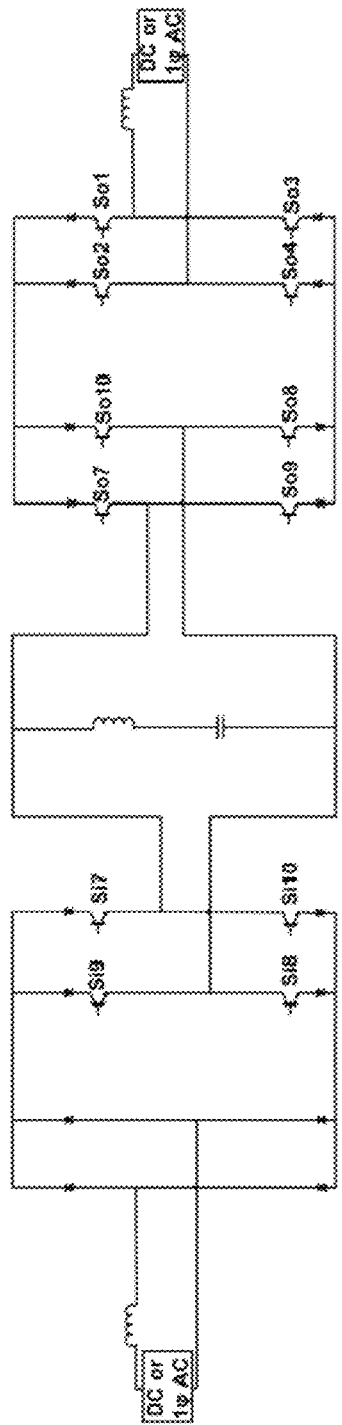
Fig. 21
Fig. 22

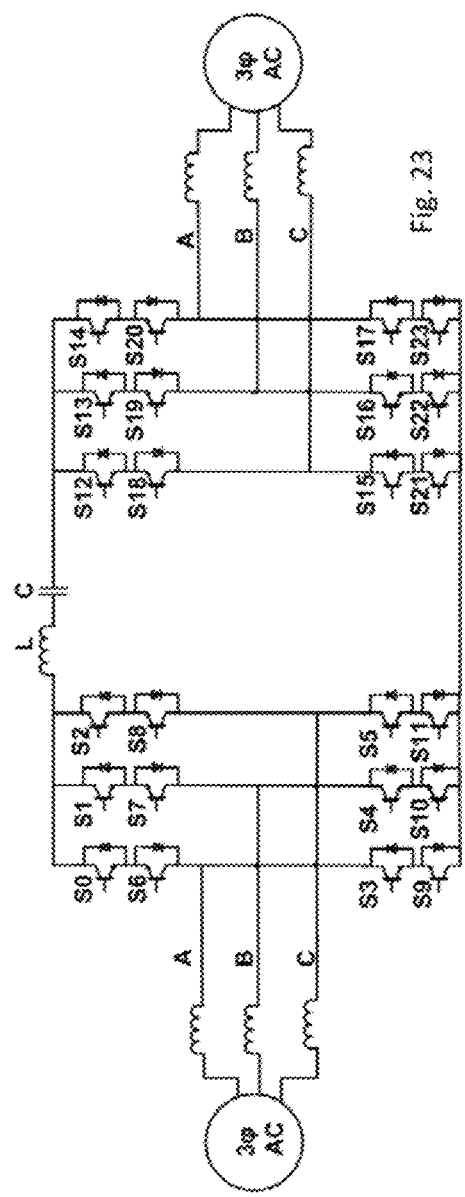
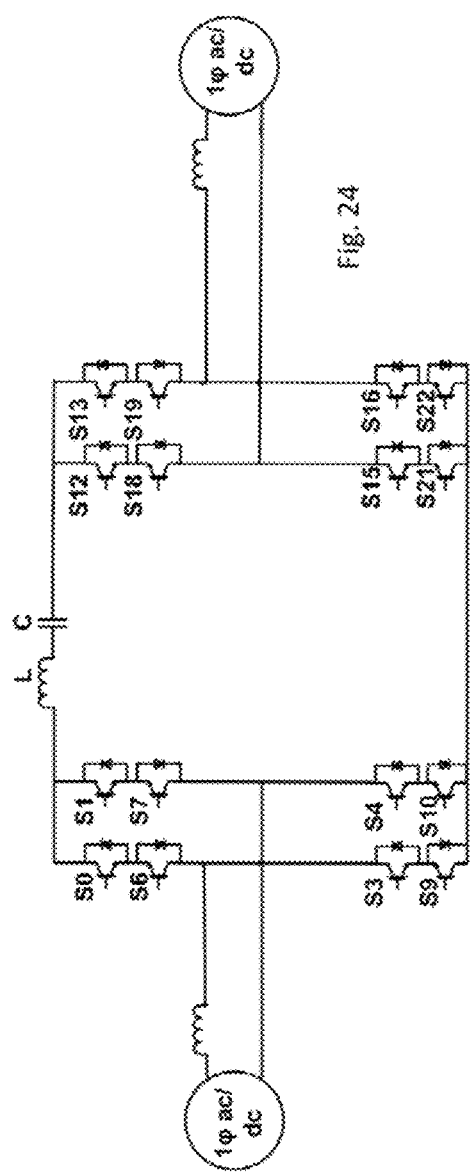
Fig. 23
Fig. 24

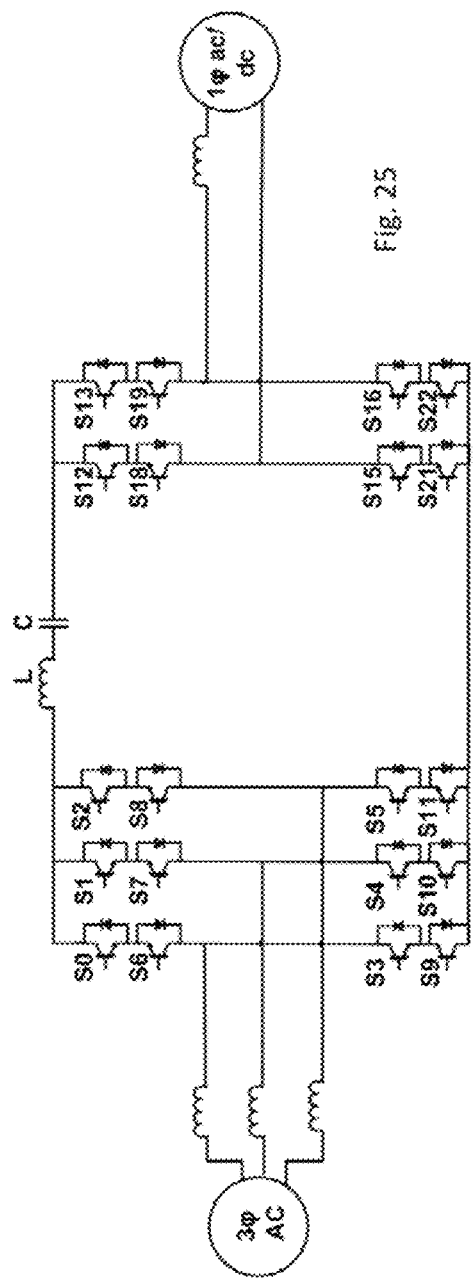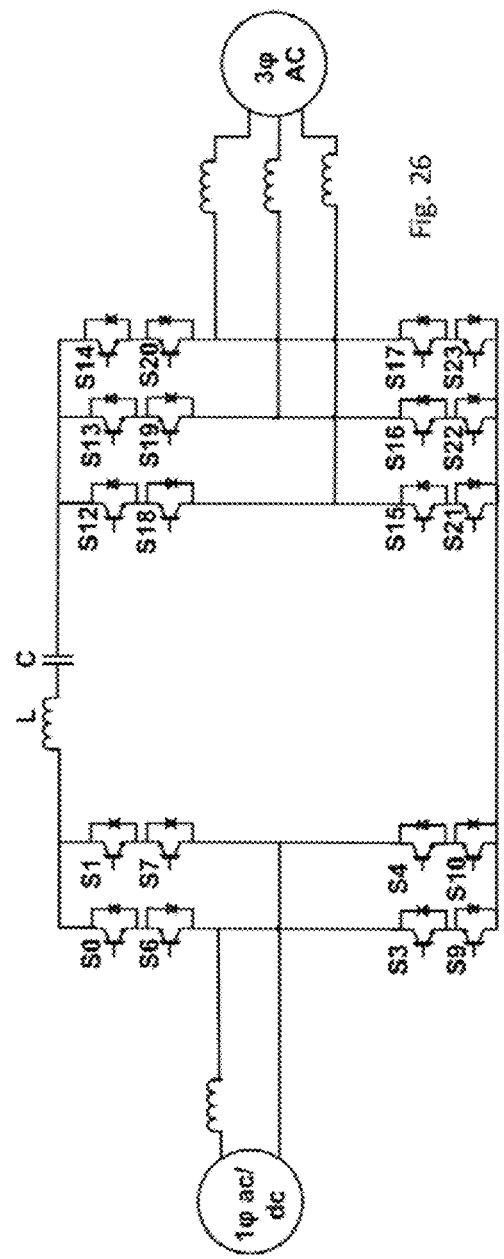

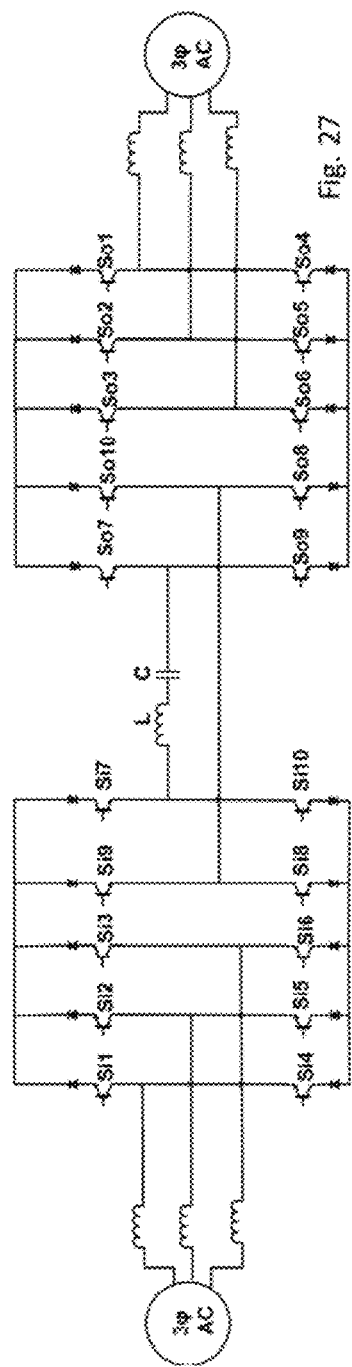
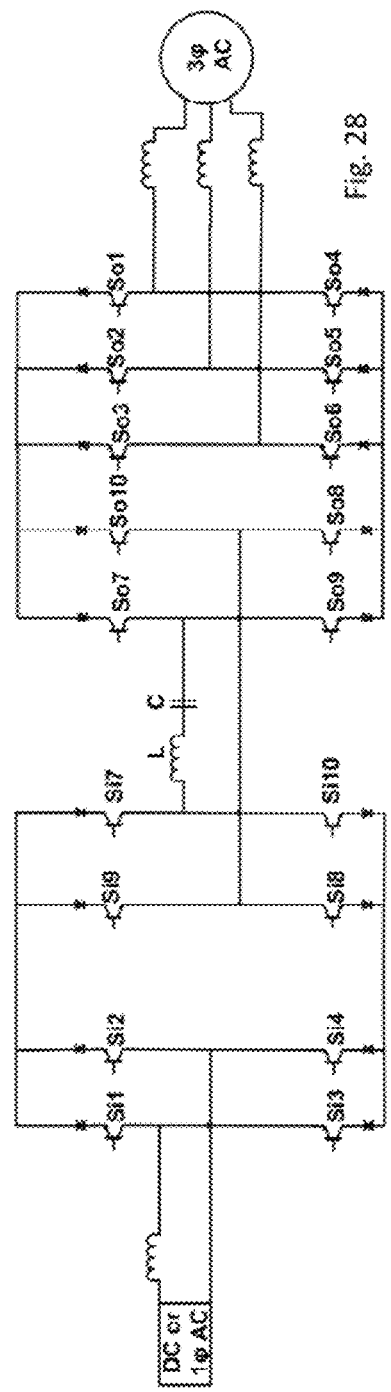

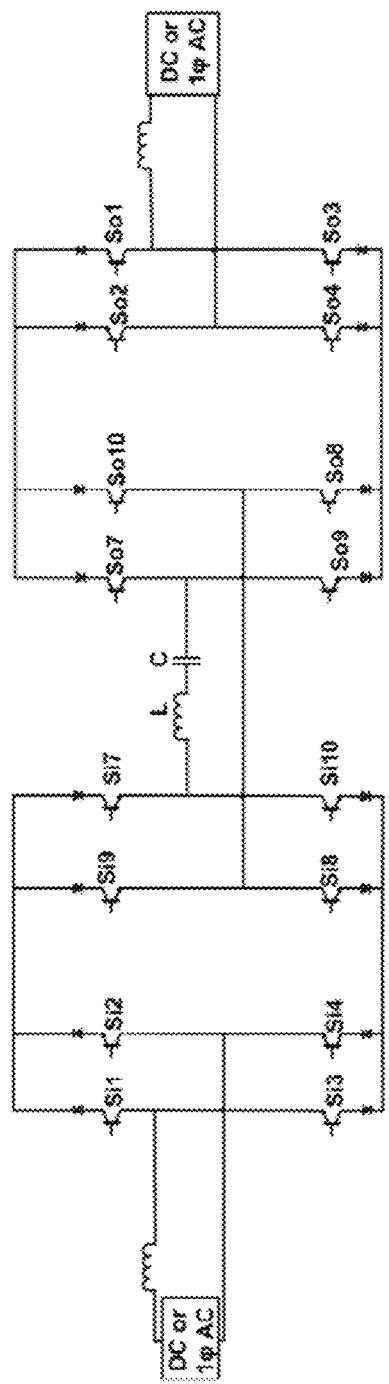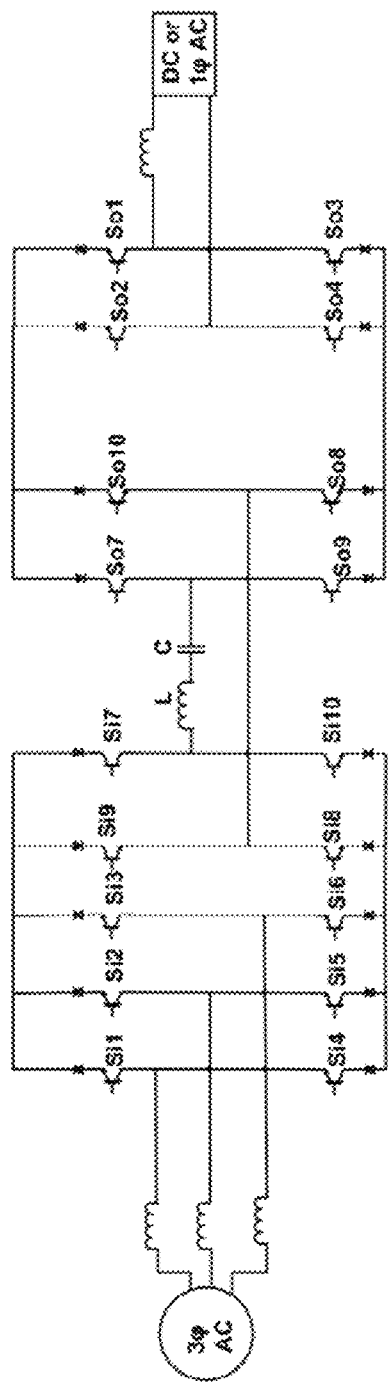

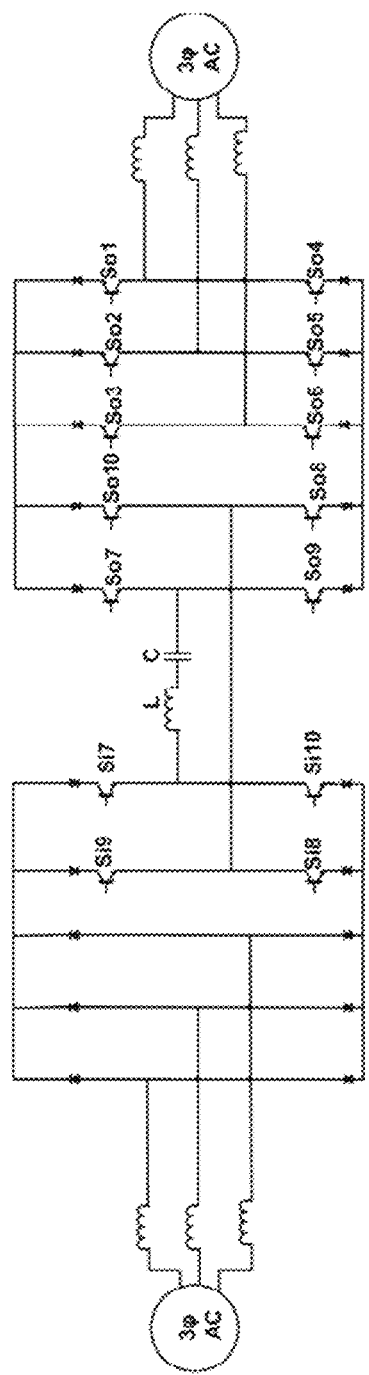
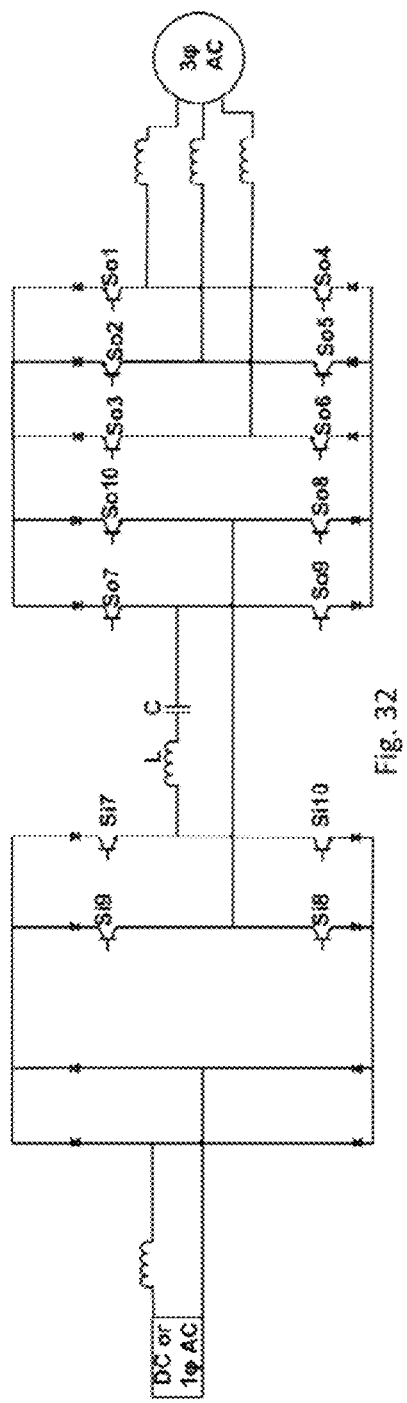
Fig. 31
Fig. 32

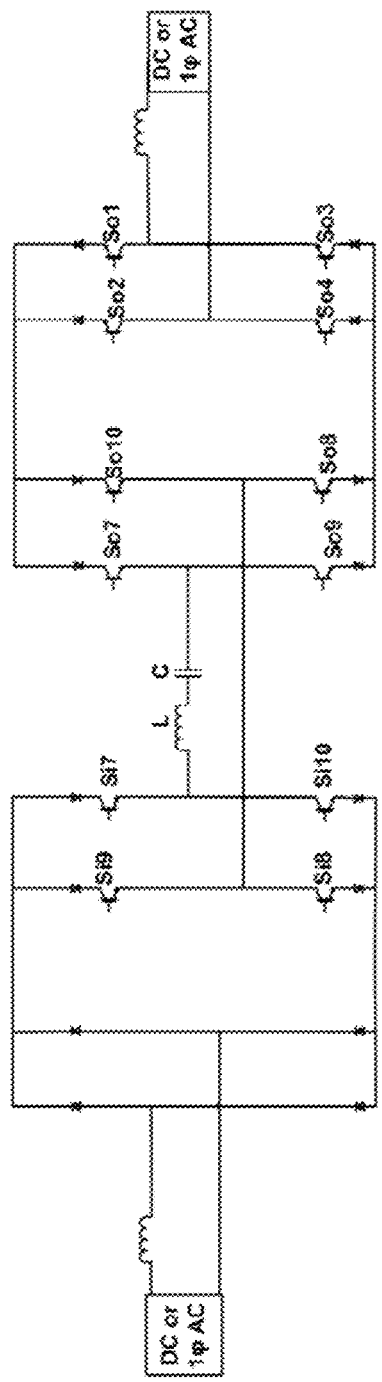
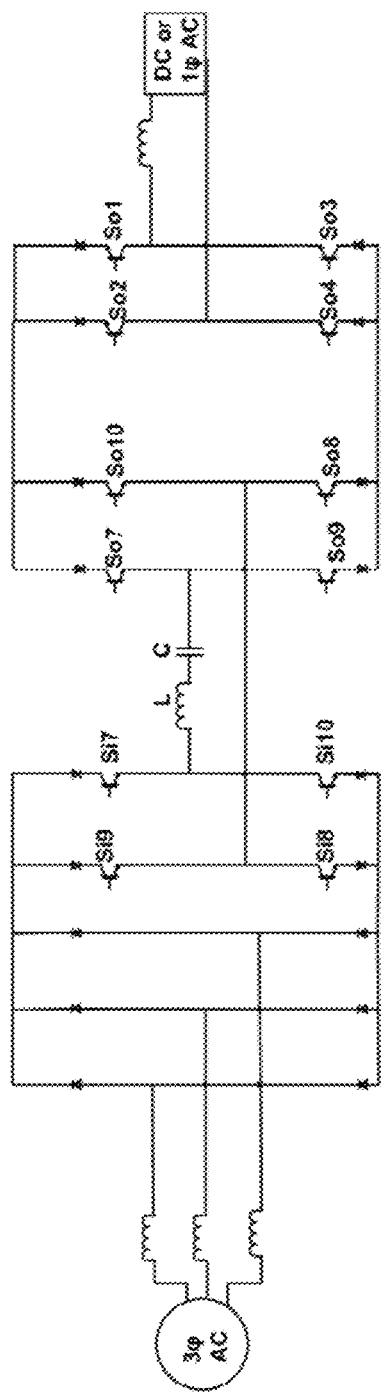
Fig. 33
Fig. 34

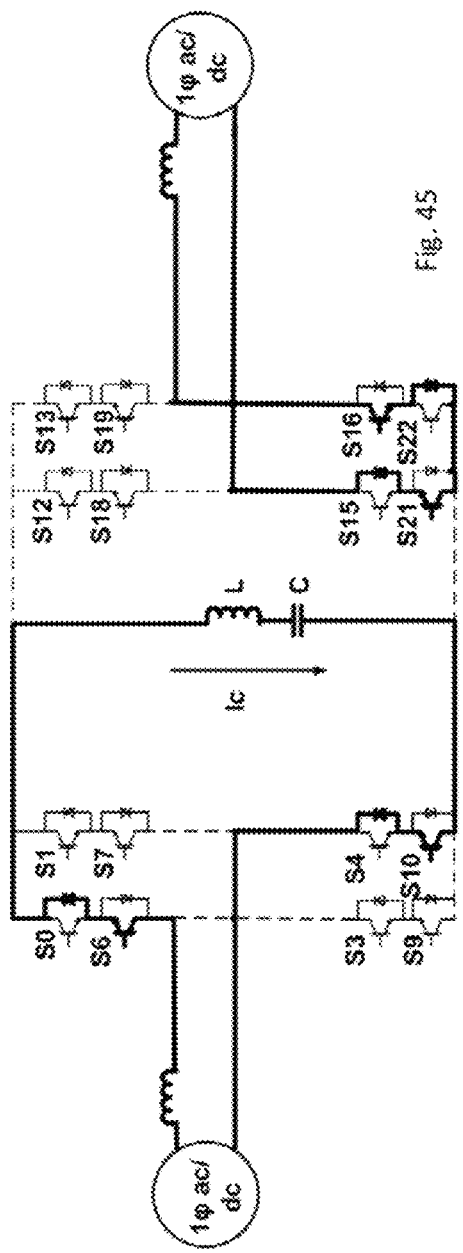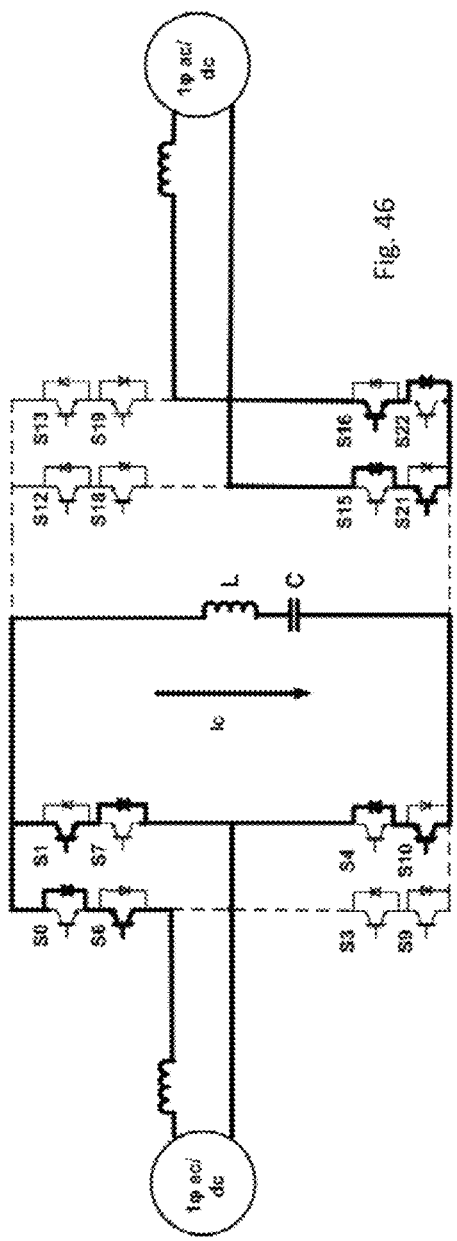

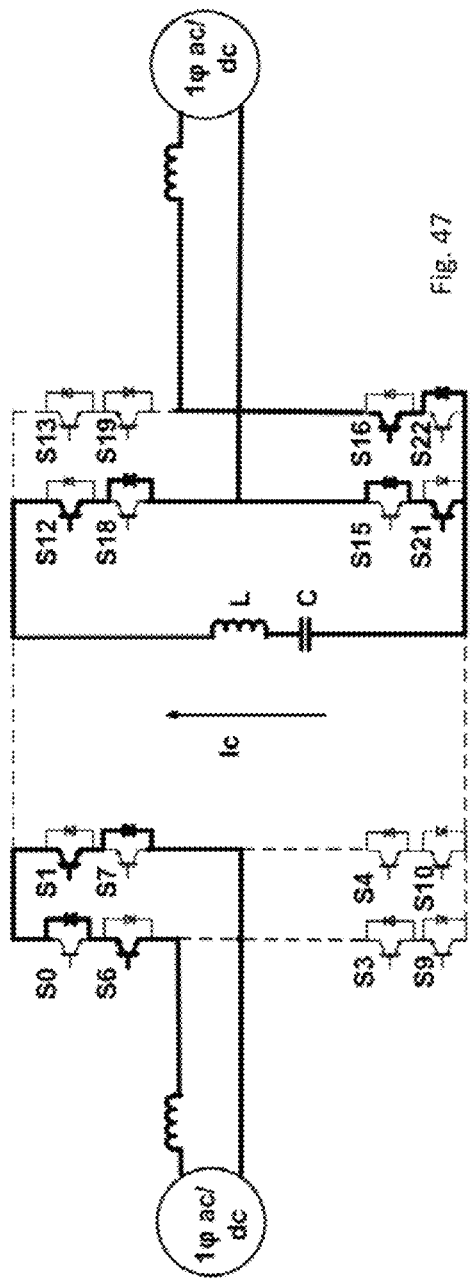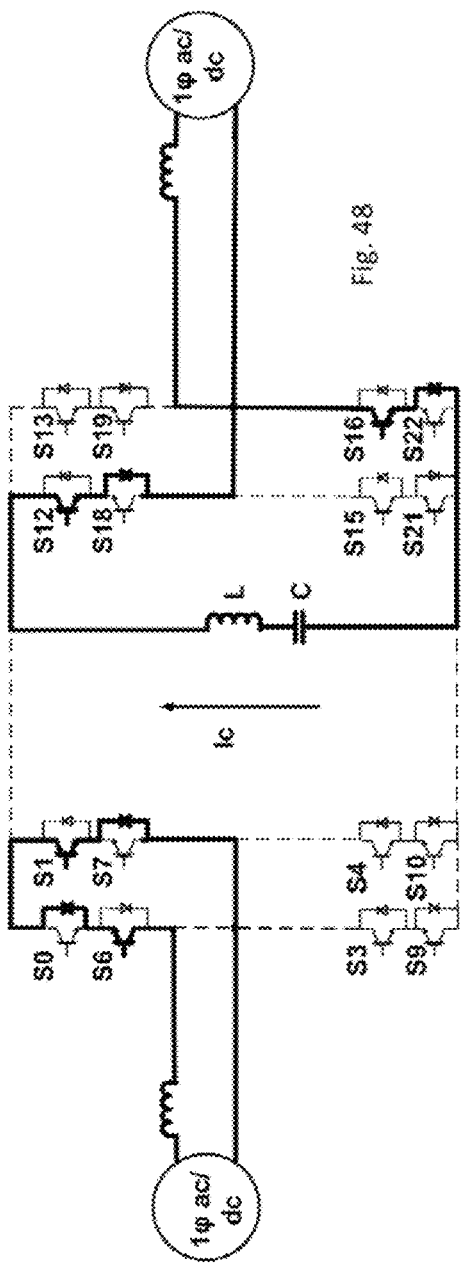

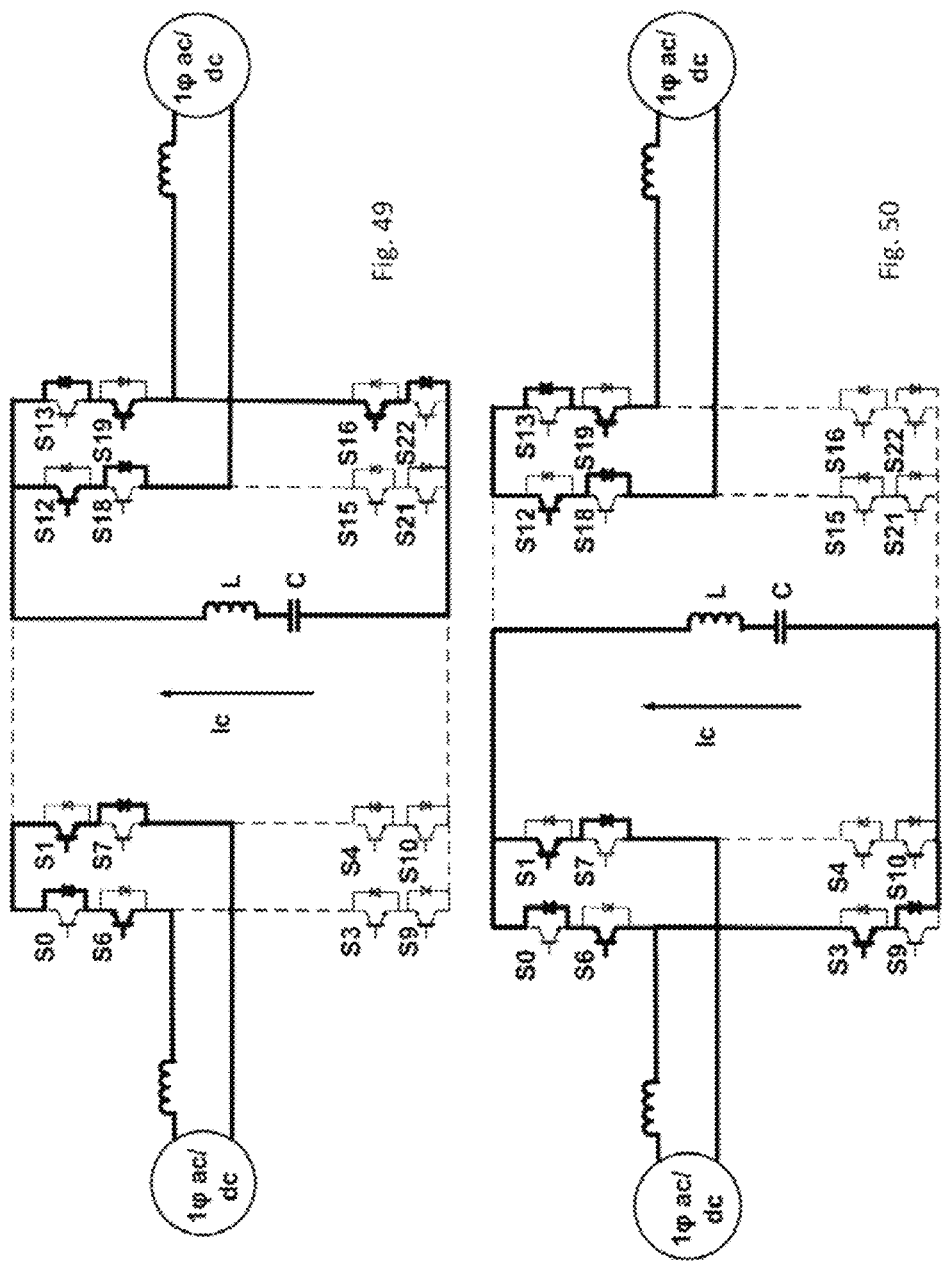

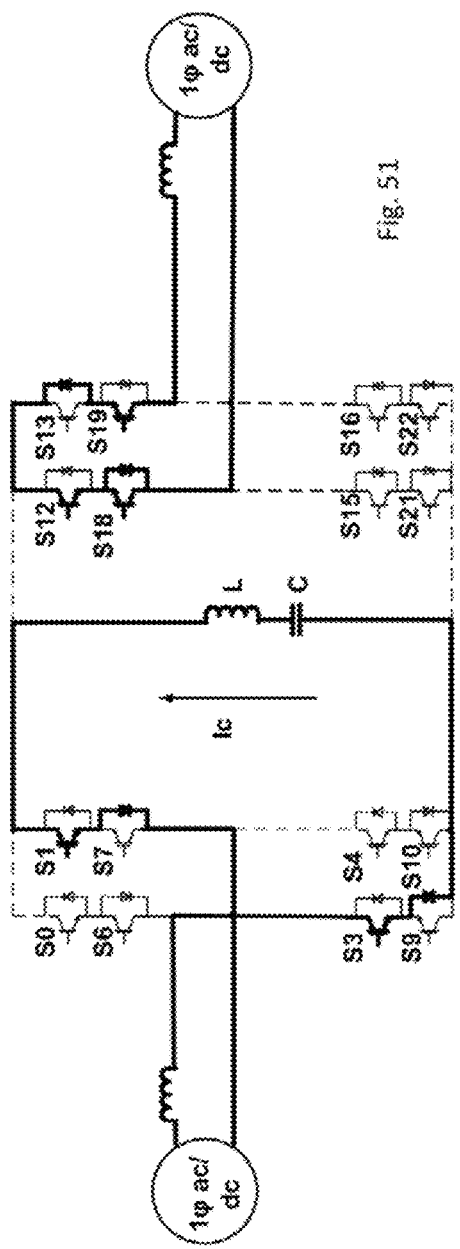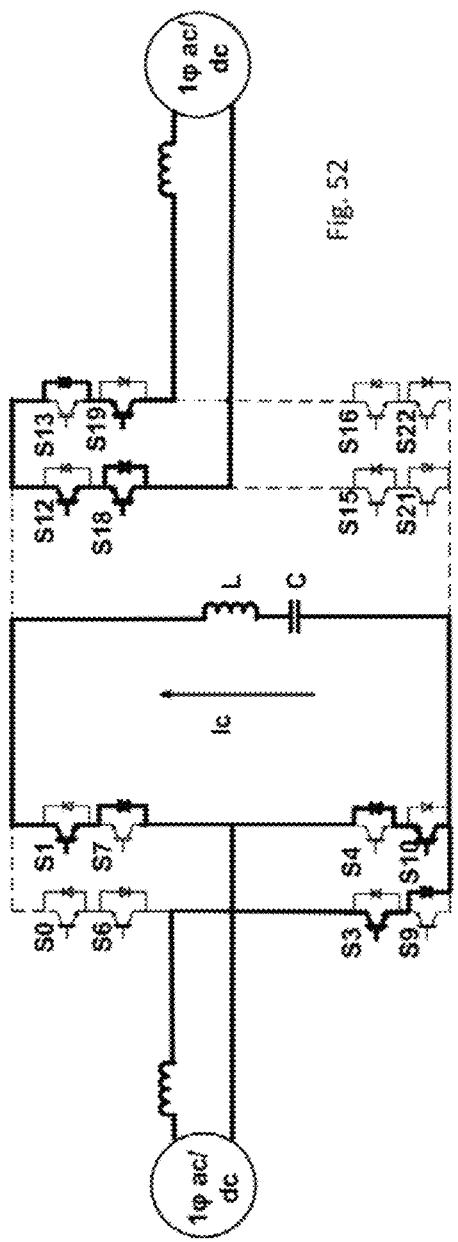

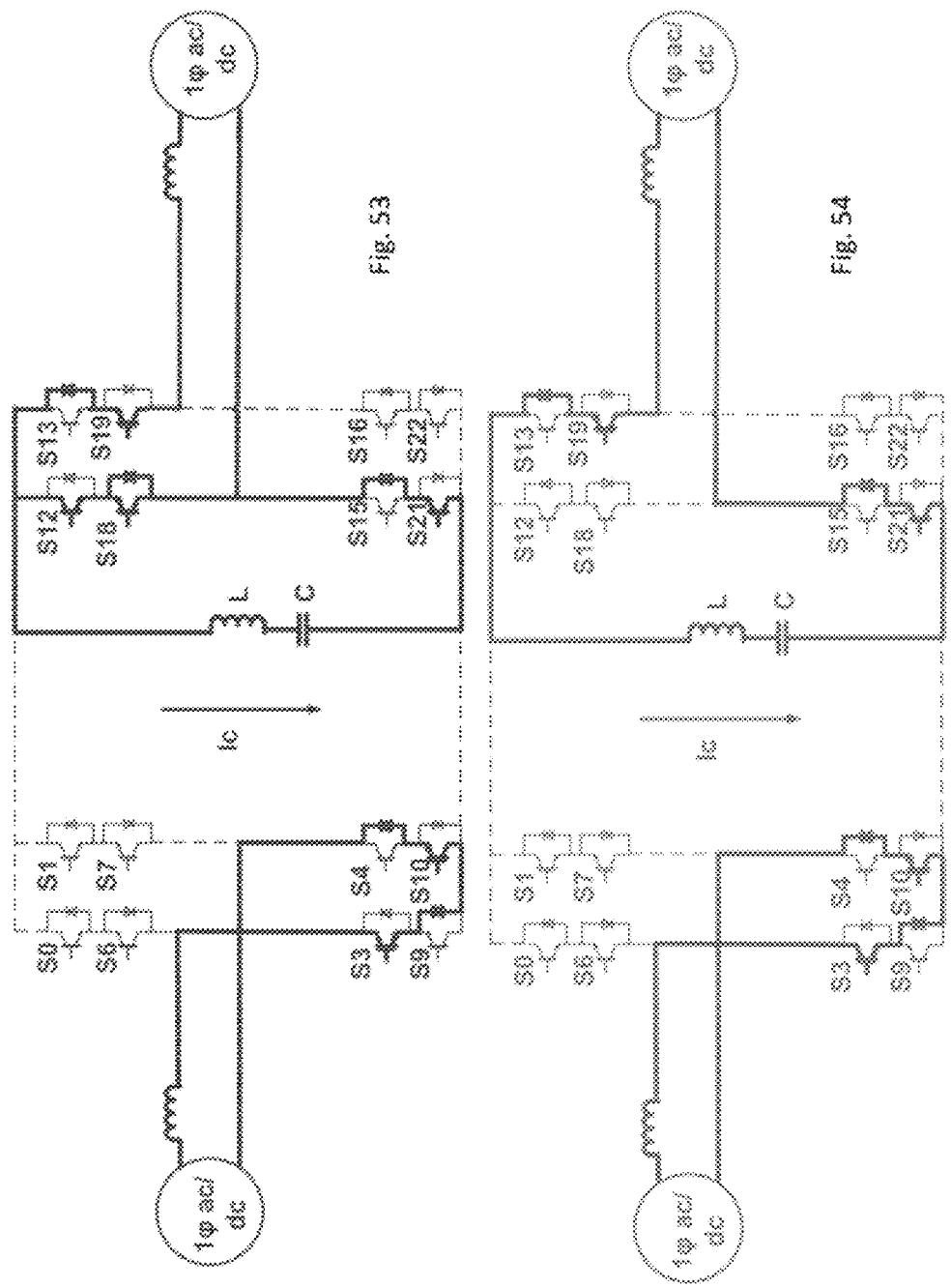

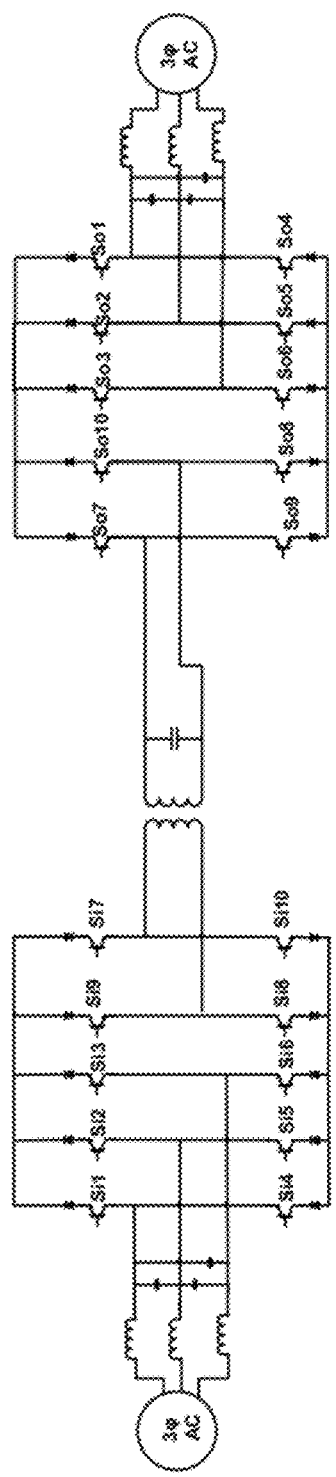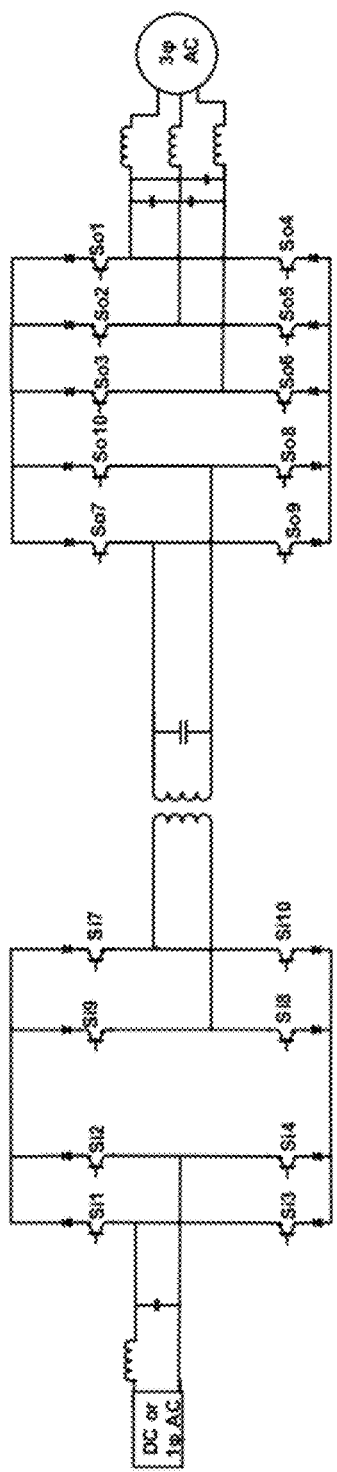
Fig. 85
Fig. 86

DC CAPACITOR-LESS POWER CONVERTERS

CROSS-REFERENCE TO A RELATED APPLICATION

This is a non-provisional application which claims priority to U.S. Provisional Application Ser. No. 61/493,210, entitled "DC Capacitor-Less Power Converters," filed Jun. 3, 2011, the entire contents of which are incorporated herein by reference.

BACKGROUND

Throughout the history of electrical and electronics devices, various apparatus have been designed that require differing characteristics of power supply. Often, the electrical power sources that are available do not have characteristics that such devices require. For example, devices may require either alternating current (AC) or direct current (DC) power. AC devices may be single phase or poly phase (most commonly three phase), or may have various frequencies. Additionally, the operating voltage, minimum or maximum current, frequency, etc. of the power source may vary. Electronic power converters are frequently used in these applications to match the available power supply to the characteristics of a particular device.

In other applications, manipulation of the characteristics of the supplied power is used to control the operation of a device. One such example is the variable frequency drive (VFD) for an induction motor. It is well-known that varying the frequency of the alternating current supplied to an induction motor will vary its rotation speed, which is useful in many industrial applications. It is further known that control of the voltage and current is also required to optimize operation and avoid damage to the motor in such use. Again, electronic power converters are used to take whatever supply of electrical power is available and adapt it as necessary.

Another application of the electronic power converter is the uninterruptible power supply (UPS), in which two or more power sources are connected to a load to prevent interruption of one power source from disrupting operation of the load. Such systems are frequently used with computers and networking equipment as well as other critical loads such as industrial control systems, hospital life support systems, etc. In many cases, the primary power source is an alternating current source while the standby source is a battery. Ideally, in such arrangements, a single power converter can be adapted to provide whatever type of power supply is required for the load from either power source (DC vs. AC, single vs. poly phase, etc.)

For these and other applications, a variety of electronic power converters have been developed. Of particular interest are a certain class of "universal" power converters, which are identified by their ability to accept any of a DC, AC single phase, AC poly phase input of any voltage, frequency, and current characteristics and generate any desired output, whether DC, AC single phase, or AC poly phase, having any desired voltage, frequency, and/or current characteristics. Such universal converters typically comprise three primary components: (1) an input stage, which typically takes the form of a controlled rectifier; (2) a link or storage stage, which has historically taken the form of a DC link including a relatively large storage capacitor; and (3) an output stage, typically in the form of some sort of inverter. The controlled rectifier of the input stage is typically formed from a plurality of semiconductor devices, which could be either thyristors, insulated gate bipolar transistors (IGBTs), or some form of power transistors. The output stage is also typically formed from some form of power transistor or thyristors.

One problem with such topologies has been the DC link, which, as noted above, typically includes a relatively large storage capacitor. These devices can be bulky and expensive, as well as prone to failure. All of which are generally considered to be undesirable. Very recently, electronic power converters based on partially AC resonant circuitry (rather than DC links) have been proposed. One such converter is disclosed in U.S. Pat. Nos. 7,778,045 and 7,599,196 to William Alexander, entitled "Universal Power Conversion Methods," and "Universal Power Converter," which are hereby incorporated by reference in their entireties. While Alexander's converter solves the historic difficulties associated with the DC link capacitors of the prior art, his topology relies on bi-directional switches, which unnecessarily increase the parts count, parts cost, and complexity of the device. Additionally, his topology needs a relatively large link inductor which is bulky and expensive. Moreover, Alexander's topology is suitable for the cases that the input and output appear as voltage sources, which is the reason placing the filter capacitors at input and output terminals is mandatory.

In Lipo, T. A.; "Recent Progress In The Development In Solid-State AC Motor Drives," Power Electronics, IEEE Transactions on, vol. 3, no. 2, pp. 105-117, April 1988 two resonant converters named series resonant AC link converter drive and parallel resonant AC link converter drive are introduced. In Lipo's converters, the link is resonating all the time and the current and voltage of the link are sinusoidal. Additionally, the link inductor and capacitor are both required in Lipo's converters.

A partial-resonant AC-AC Buck Boost converter is described in Kim et al., "New Bilateral Zero Voltage Switching AC/AC Converter Using High Frequency Partial Resonant Link," Korea Advanced Institute of Science and Technology, (IEEE 1990). In the converter proposed by Kim the link current has a DC component, which significantly reduces the utilization of the inductor/capacitor. Moreover, the resonating time during which no power is transferred is much longer in the converter proposed in Kim et al.

For these reasons, a need exists for a resonance-based, universal power converter having a reduced parts count and improved operating characteristics.

SUMMARY

Three resonance-based universal power converters can be constructed in various forms to convert to and from any combination of DC and single or poly phase AC. One topology includes a parallel partially resonant L-C link circuit and incorporates intermediate cross-over switching circuits between the link stage and each of the input and output stages (which are constructed using unidirectional switches), thereby permitting the resonant circuit to be operated bi-directionally. A second topology includes a series partially resonant LC link circuit placed in parallel with input and output switch bridges, which can be coupled to the input and output either by bidirectional switches or by a combination of unidirectional switches and intermediate cross-over switching circuits, again permitting the partially resonant circuit to be operated bi-directionally. A third topology includes a series partially resonant LC link circuit placed in series with the input and output switch bridges and coupled to the input and output either by bidirectional switches or by a combination of unidirectional switches and intermediate cross-over switching circuits, again permitting the partially resonant circuit to be operated bi-directionally. All embodiments permit the use of smaller reactive components in the link stage and the use of AC rather than DC capacitors, which reduces size and costs of the device while increasing the reliability. Additionally, the first topology may be constructed without a link capacitor, while the second and third topology may be constructed without a link inductor.

The foregoing summary is not intended to summarize each potential embodiment or every aspect of the present disclosure.

BRIEF DESCRIPTION OF THE DRAWINGS

FIGS. 5-8 represent power conversion circuits employing a parallel partially resonant link as well as input and output cross over circuits to permit the use of unidirectional switches in the output switch bridge and diodes in the input switch bridge (the performance of the circuit is similar to FIGS. 1-4). This configuration is applicable if the input power factor is supposed to be unity.

FIG. 13 shows a three-phase AC to DC or single-phase AC power conversion circuit employing a series partially resonant link with bidirectional switches making up the input and output switch bridges which are in parallel with the link.

FIG. 14 shows a DC or single-phase AC to three-phase AC power conversion circuit employing a series partially resonant link with bidirectional switches making up the input and output switch bridges which are in parallel with the link.

FIGS. 15-18 represent power conversion circuits employing a series partially resonant link in parallel with input and output cross over circuits to permit the use of unidirectional switches in the input and output switch bridges (the performance of these power conversion circuits is similar to that of power conversion circuits shown in FIGS. 11-14).

FIGS. 19-22 represent power conversion circuits employing a series partially resonant link in parallel with input and output cross over circuits to permit the use of unidirectional switches in the output switch bridge and diodes in the input switch bridge (the performance of the circuit is similar to FIGS. 11-14). This configuration is applicable if the input power factor is supposed to be unity.

FIG. 23 shows a three-phase AC to three-phase AC power conversion circuit employing a series partially resonant link with bidirectional switches making up the input and output switch bridges which are in series with the link.

FIG. 24 shows a DC or single-phase AC to DC or single-phase AC power conversion circuit employing a series partially resonant link with bidirectional switches making up the input and output switch bridges which are in series with the link.

FIG. 25 shows a three-phase AC to DC or single-phase AC power conversion circuit employing a series partially resonant link with bidirectional switches making up the input and output switch bridges which are in series with the link.

FIG. 26 shows a DC or single-phase AC to three-phase AC power conversion circuit employing a series partially resonant link with bidirectional switches making up the input and output switch bridges which are in series with the link.

FIGS. 27-30 represent power conversion circuits employing a series partially resonant link in series with input and output cross over circuits to permit the use of unidirectional switches in the input and output switch bridges (the performance of these power conversion circuits is similar to that of power conversion circuits shown in FIGS. 23-26).

FIGS. 31-34 represent power conversion circuits employing a series partially resonant link in series with input and output cross over circuits to permit the use of unidirectional switches in the output switch bridge and diodes in the input switch bridge (the performance of the circuit is similar to FIGS. 23-26). This configuration is applicable if the input power factor is supposed to be unity.

FIGS. 45-56 illustrate the switching sequence for operation of a DC or single phase to DC or single phase power conversion circuit employing a series partially resonant link placed in parallel with input and output switch bridges.

FIGS. 85-96 illustrate the various embodiments disclosed in conjunction with a transformer to provide the galvanic isolation.

DETAILED DESCRIPTION

Figure 1:
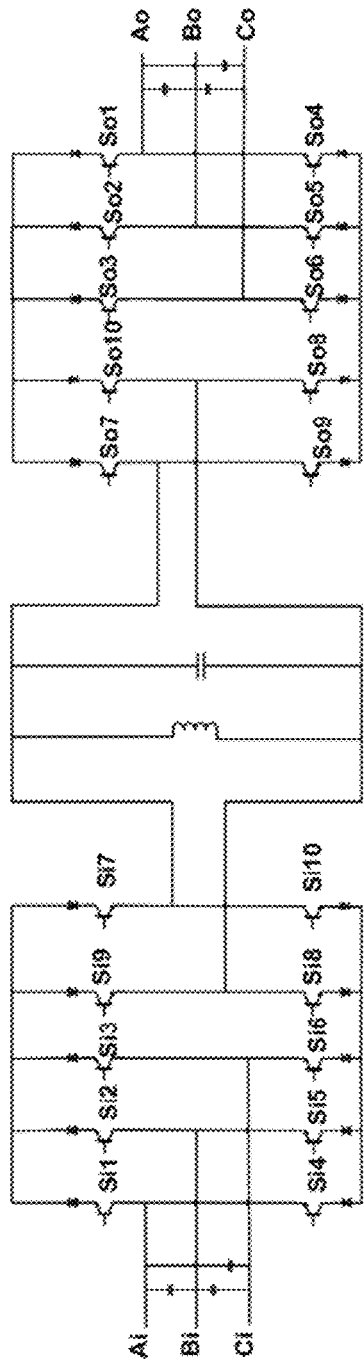
FIG. 1 shows a three-phase AC to three-phase AC power conversion circuit employing a parallel partially resonant link as well as input and output cross over circuits to permit the use of unidirectional switches in the input and output switch bridges.
Figure 2:
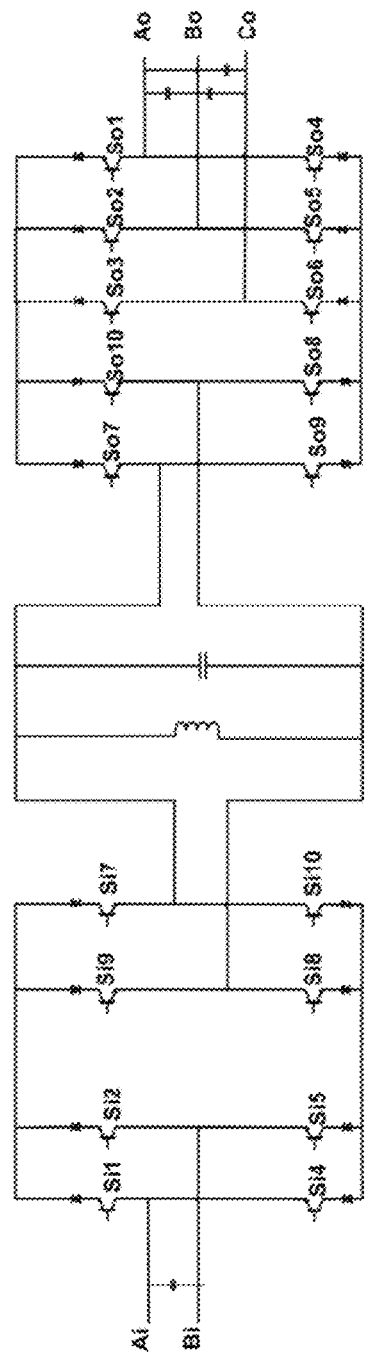
FIG. 2 shows a DC or single-phase AC to three-phase AC power conversion circuit employing a parallel partially resonant link as well as input and output cross over circuits to permit the use of unidirectional switches in the input and output switch bridges.
Figure 3:
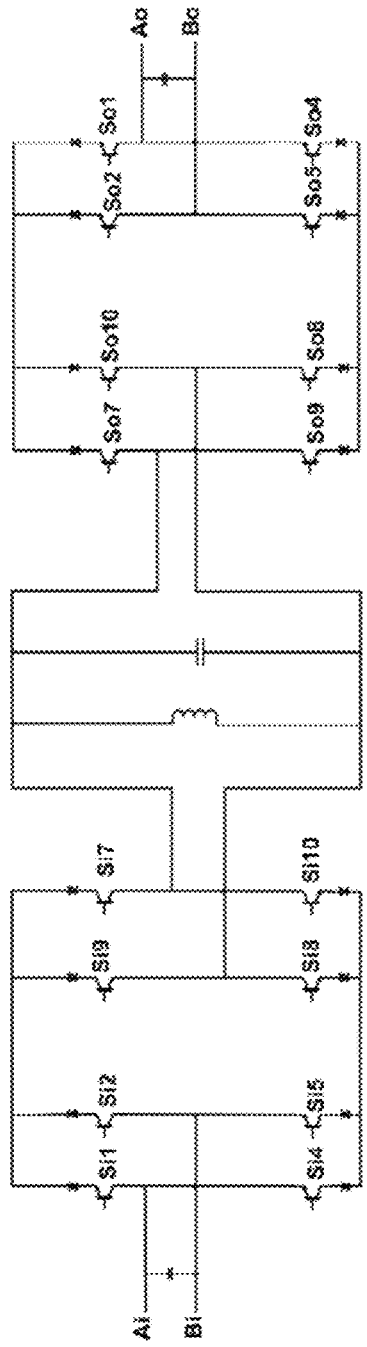
FIG. 3 shows a DC or single-phase AC to DC or single-phase AC power conversion circuit employing a parallel partially resonant link as well as input and output cross over circuits to permit the use of unidirectional switches in the input and output switch bridges.
Figure 4:
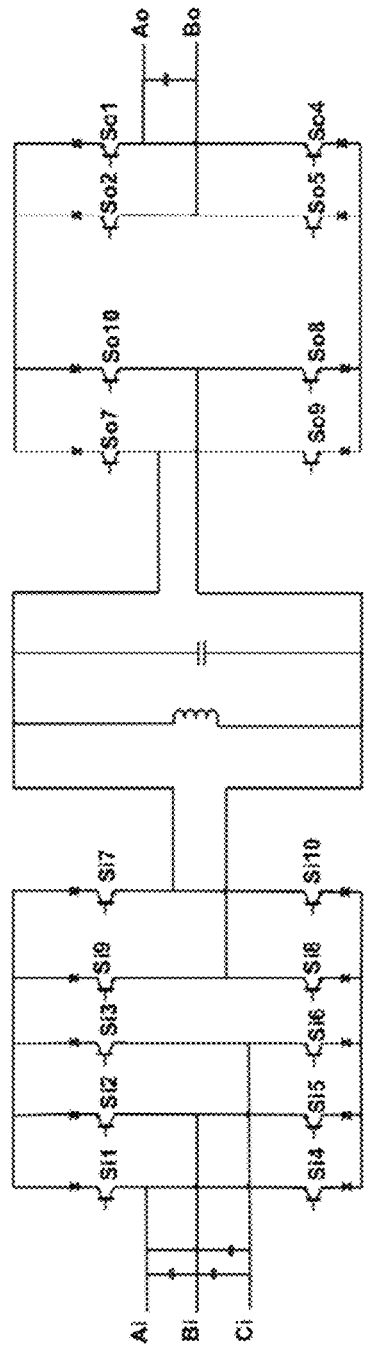
FIG. 4 shows a three-phase AC to DC or single-phase AC power conversion circuit employing a parallel partially resonant link as well as input and output cross over circuits to permit the use of unidirectional switches in the input and output switch bridges.
Figure 9:
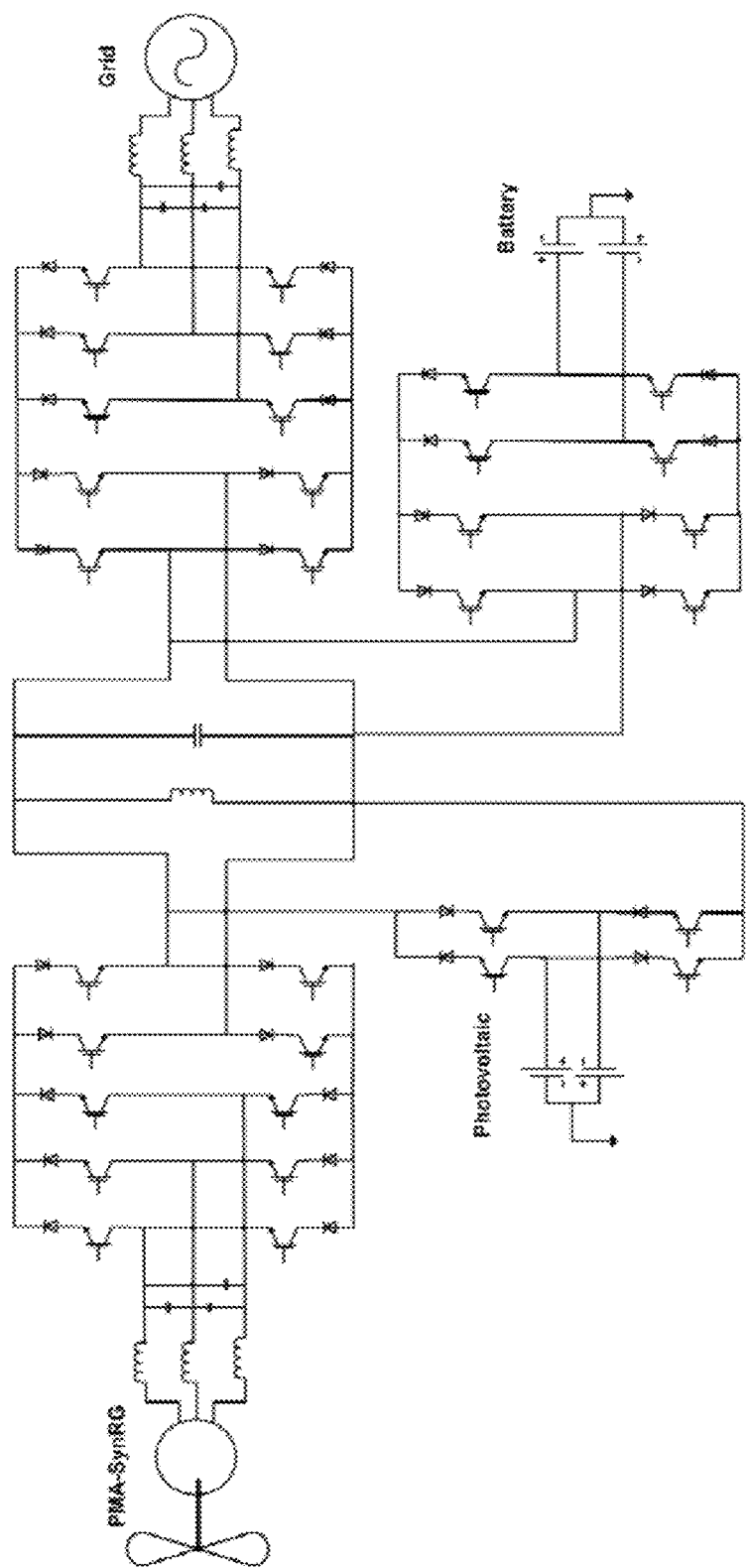
FIG. 9 shows an example of multi input power conversion circuit employing a parallel partially resonant link as well as input and output cross over circuits to permit the use of unidirectional switches in the input and output switch bridges.
Figure 10:
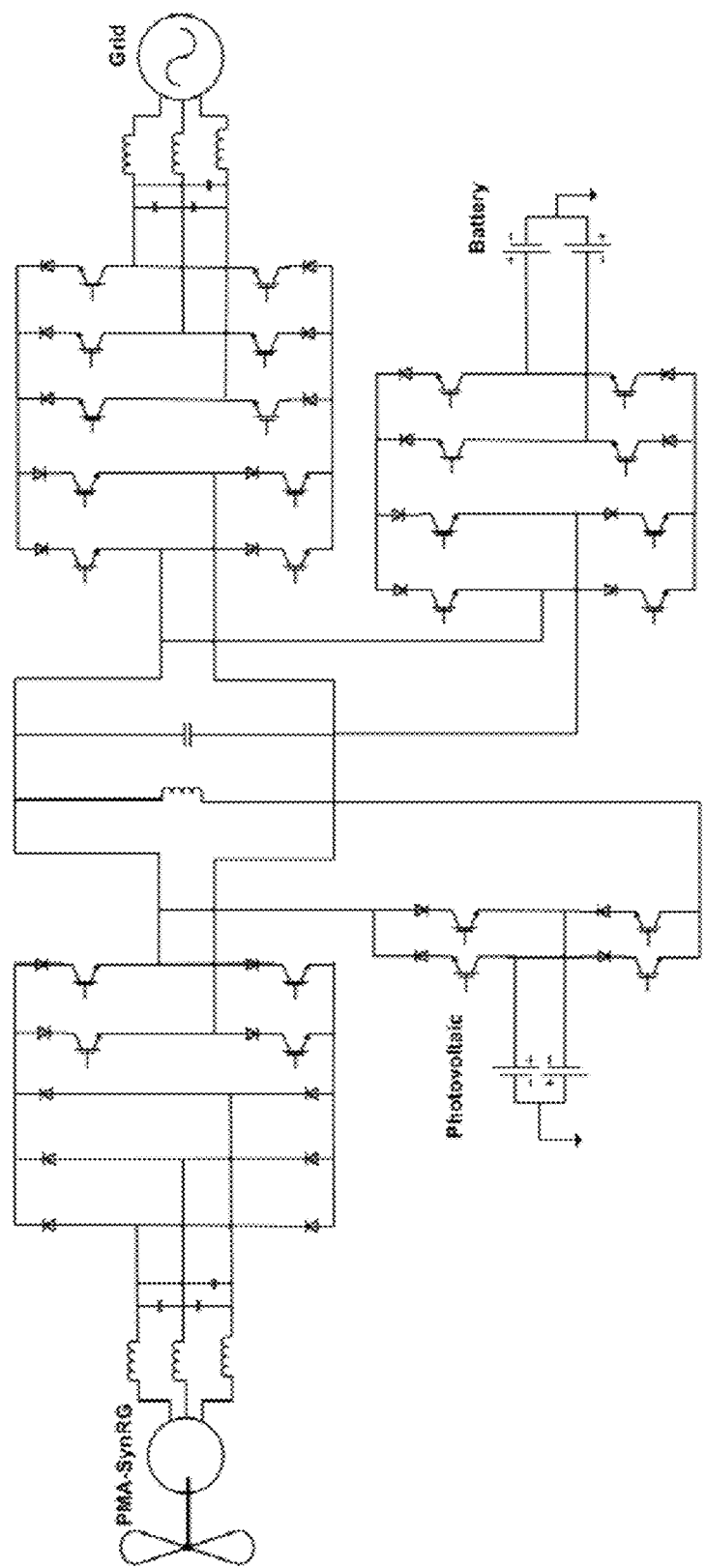
FIG. 10 shows an example of multi input power conversion circuit employing a parallel partially resonant link as well as input and output cross over circuits to permit the use of unidirectional switches in the output switch bridge and diodes in the input switch bridge.
Figure 11:
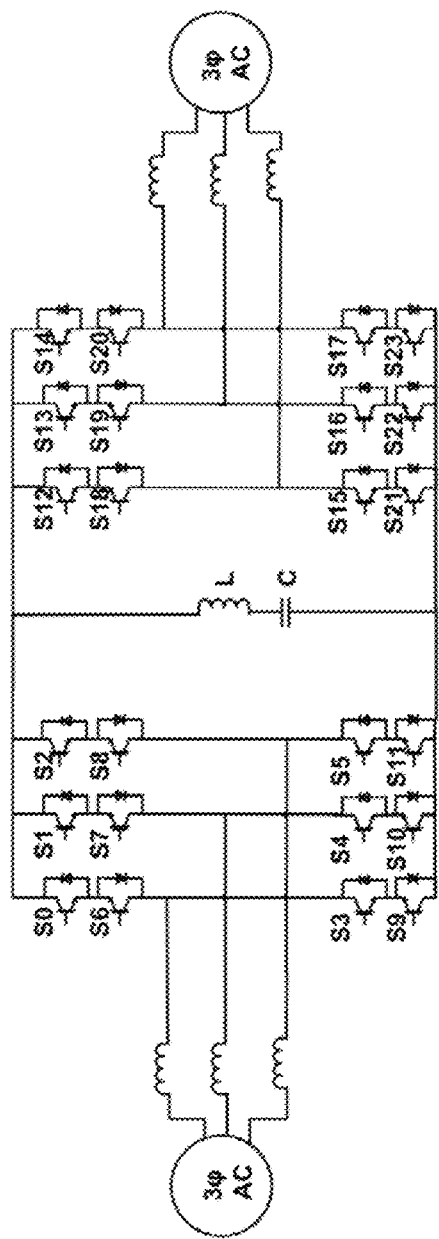
FIG. 11 shows a three-phase AC to three-phase AC power conversion circuit employing a series partially resonant link with bidirectional switches making up the input and output switch bridges which are in parallel with the link.

Disclosed herein are three groups of embodiments of a resonance-based universal power converter. Each can be constructed in various forms, including DC (or single phase AC)-to-DC (or single phase AC), poly phase AC-to-poly phase AC, poly phase AC-to-DC (or single phase AC), or DC (or single phase AC)-to poly phase AC.

A first group of embodiments (FIGS. 1-8) can include a parallel partially resonant L-C circuit as the link stage. These embodiments can include an input switch bridge (switches Si1-Si6) coupled to the parallel partially resonant L-C link by an intermediate cross-over switching circuit (switches Si7-Si10) that permits the partially resonant circuit to be operated bi-directionally, increasing the utilization of the resonant components, which can improve the efficiency of the conversion and allow a reduction in the size and ratings of the components required for a given power level. The link capacitor can be either parasitic capacitance of the inductor alone or an added discrete device(s). This first group of embodiments also includes an output switch bridge (switches So1-So6) that supplies output power to the load. The output switch bridge is itself coupled to the parallel partially resonant L-C circuit by an additional intermediate cross-over switching circuit (switches So7-So10). Again, this intermediate cross-over switching circuit permits the partially resonant circuit to be operated bi-directionally, which affords the advantages discussed above. The unidirectional switching components can conduct in one direction but should block both positive and negative voltages. Power conversion circuits shown in FIGS. 5-8 are applicable when unity power factor at input side is desired.

A second group of embodiments (FIGS. 11-14) can include a series partially resonant LC circuit as the link stage placed in parallel with the input and output switch bridges. The link reactance can be formed by a capacitor that is in series with a discrete inductor, or which itself has a high parasitic inductance. This link stage can be coupled to the input power source by an input switch bridge (switches S0-S11) that can be based on bidirectional switching components (as shown) to allow bidirectional utilization of the resonant components. In the illustrated embodiments, the bidirectional switching components can be any versions of bi-directional conducting and blocking switch (BCBS). As an alternative to the illustrated bidirectional switches, the series partially resonant LC circuit based topologies could include unidirectional switches and be coupled to the series partially resonant link stage by an intermediate cross-over switching circuit (as shown in FIGS. 15-22). Power conversion circuits shown in FIGS. 19-22 are applicable when unity power factor at input side is desired.

Similarly, the series partially resonant LC link stage can also be coupled to the load by an output switch bridge that, as illustrated in FIGS. 11-14 can comprise bidirectional switches (S12-S23). As in the input switch bridge discussed above, the bidirectional switches can be any versions of bi-directional conducting and blocking switch (BOBS). Again, as an alternative to the bidirectional switching devices illustrated, an intermediate cross-over switching circuit could be used to permit bidirectional operation of the series partially resonant LC link (as illustrated in FIGS. 15-22).

A third group of embodiments (FIGS. 23-26) can include a series partially resonant LC circuit as the link stage placed in series with the input and output switch bridges. The link reactance can again be formed by a capacitor that is in series with a discrete inductor, or which itself has a high parasitic inductance. This link stage can be coupled to the input power source by an input switch bridge (switches S0-S11) that can be based on bidirectional switching components (as shown) to allow bidirectional utilization of the resonant components. In the illustrated embodiments, the bidirectional switching components can be any versions of bi-directional conducting and blocking switch (BOBS). As an alternative to the illustrated bidirectional switches, the series partially resonant LC circuit based topologies could include unidirectional switches and be coupled to the series partially resonant link stage by an intermediate cross-over switching circuit (as shown in FIGS. 27-34). Power conversion circuits shown in FIGS. 31-34 are applicable when unity power factor at input side is desired.

Similarly, the series partially resonant LC link stage can also be coupled to the load by an output switch bridge that, as illustrated in FIGS. 23-26 can comprise bidirectional switches (S12-S23). As in the input switch bridge discussed above, the bidirectional switches can be any versions of bi-directional conducting and blocking switch (BOBS). Again, as an alternative to the bidirectional switching devices illustrated, an intermediate cross-over switching circuit could be used to permit bidirectional operation of the series partially resonant LC link (as illustrated in FIGS. 27-34).

Operation of the parallel-partially resonant topology illustrated in FIGS. 1-4 will now be described with reference to FIGS. 35-43. In these embodiments, it will be appreciated that the link inductor is charged through input phase pairs and the stored energy will be transferred to the output. Between each charging and discharging mode, there will be a resonating mode in which all the switches will be turned off and the link will resonate. This facilitates the zero voltage turn on (which improves operating efficiency). Soft turn off of the switches would be possible through the link capacitor. It should be noted that the link has low reactive ratings. Switches Si7-Si10 and So7-So10 (referenced above as intermediate cross-over switching circuits) enable the link to conduct both positive and negative currents, which results in increased utilization of the inductor and capacitor. This enhances the performance and efficiency of the converter, as well as allowing smaller (i.e., lower capacitance/inductance) components, which decreases the cost and size of the converter.

Figure 36:
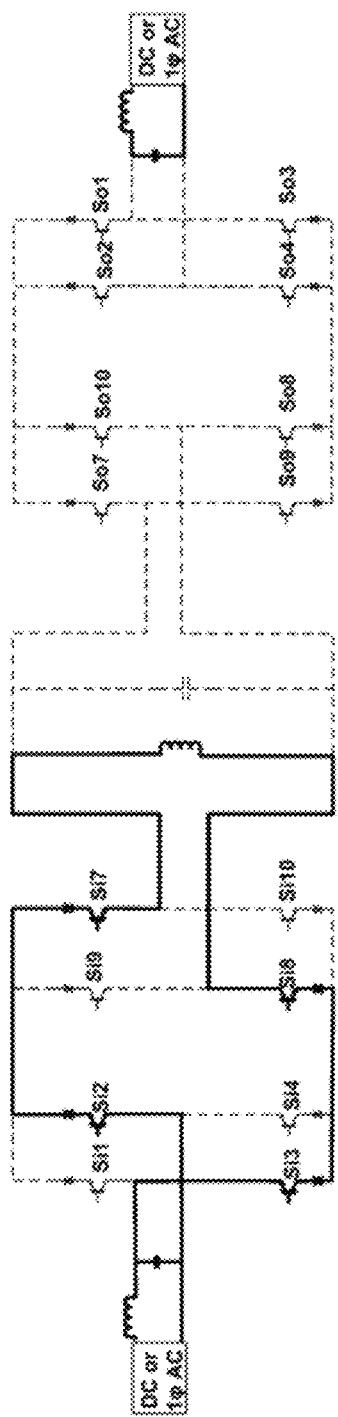
FIGS. 36-38 illustrate operation of a DC or single phase AC to DC or single phase AC power conversion circuit employing a parallel resonant power converter having input and output crossover circuits permitting the use of unidirectional switches with bidirectional operation of the parallel partially resonant circuit.
Figure 37:
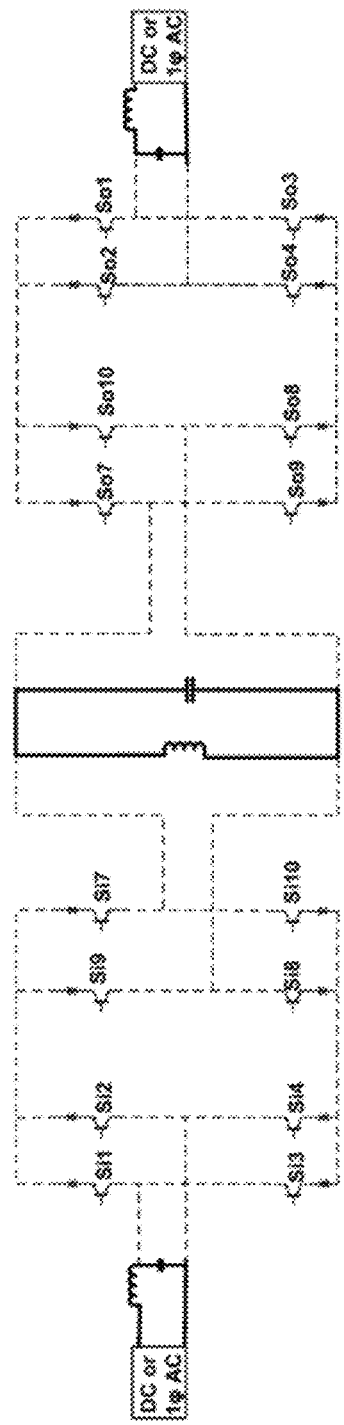

As shown in FIG. 36, the link inductor will be charged through input during mode 1. In this mode the link current (inductor current) is supposed to be positive (top to bottom), therefore, Si7 and Si8 will conduct. Once the input current meets its reference or the link current reaches its predetermined peak (depending on the control strategy), the input switches will be turned off, initiating the second mode of operation (illustrated in FIG. 37). During this mode, the link will resonate, the link voltage will swing, and its polarity will change.

Figure 38:
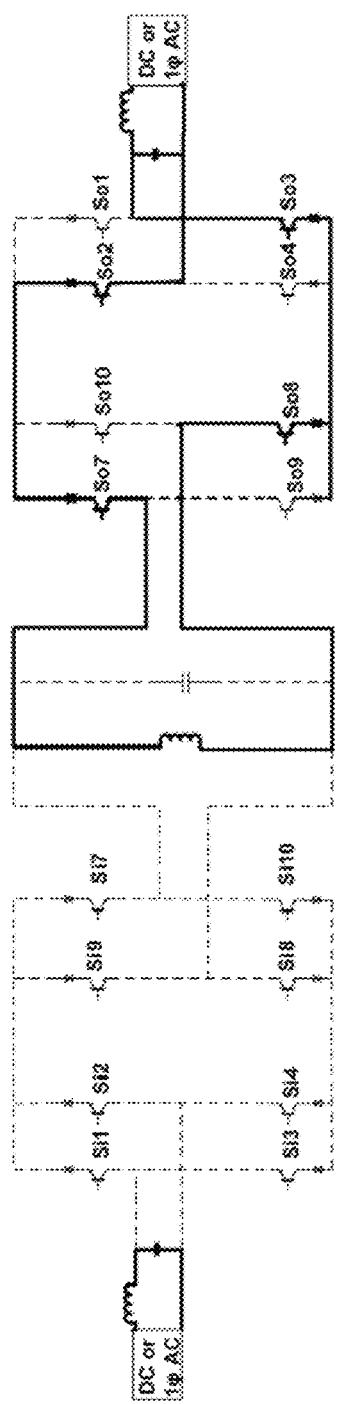
Figure 39:
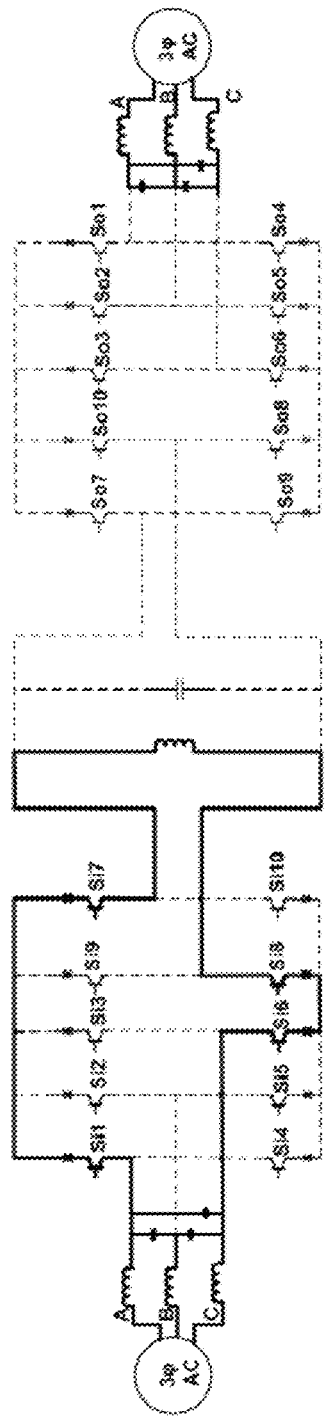
FIGS. 39-43 illustrate operation of a three phase AC to three phase AC power conversion circuit employing a parallel partially resonant power converter having input and output crossover circuits permitting the use of unidirectional switches with bidirectional operation of the partially resonant circuit.

Once the absolute value of link voltage is equal to that of the output voltage, the output switches (which have been enabled during the resonant mode) will start to conduct, initiating mode 3, illustrated in FIG. 38. It will be appreciated that this results in zero voltage turn on for the output switches. During mode 3, the link will discharge into the output. Once the link has enough energy to reach to a predetermined maximum voltage (larger than both input and output voltages) the output switches are turned off, initiating mode 4, in which the link again resonates (see FIG. 37).

In mode 4, the link resonates, again causing a swing in the link voltage. After reaching the maximum value the link voltage starts to decrease due to the change in the polarity of the link current. Once the absolute value of the link voltage becomes equal to the absolute value of the input voltage, the proper input switches that are enabled during mode 4 will be forward biased initiating mode 5. Modes 5-8 are similar to modes 1-4 except that the link current is reversed; therefore, switches Si9, Si10, So9, and So10 will conduct instead of switches Si7, Si8, So7, and Sob. During mode 5 input switches Si1, Si4, S9 and S10 will conduct. As in the first mode sequence, input switches are turned on at zero voltage.

The sequence of operation for a three phase AC-AC converter is similar to that of the DC-DC case described above, except that the charging and discharging modes can be each divided into two modes to facilitate operation at any desired power factor and also reduce total harmonic distortion (THD) on both the input and output currents. For poly-phase operation, the phases carrying the maximum input and output currents should be identified. In the description that follows, it is assumed that phase A in both input and output carries the maximum current. It will be understood by those skilled in the art that the phase carrying the highest instantaneous current will continually shift during operation and that the same input and output phases need not carry maximum current at the same time.

Before the start of mode 1 (illustrated in FIG. 39), all the switches that are supposed to conduct during mode 1 will be activated. However, they will not conduct because they are reversed biased. Once the link voltage becomes equal to the instantaneous voltage between phases A and C (i.e., |V_AC_i|), assuming the magnitude of the voltage across the input phase pair AC is higher than the magnitude of the voltage across the input phase pair AB, Si6, Si1, Si7 and Si8 will be forward biased and mode 1 starts. During mode 1 input phases A and C will charge the link. Once phase C meets its current reference, switch Si6 will be turned off, starting mode 2 (illustrated in FIG. 40). During mode 2 the link will resonate, and the voltage of the link will decrease. Once the link voltage becomes equal to the instantaneous voltage between phases A and B (i.e., |V_AB_i|), Si5, Si1, Si7, and Si8 will be forward biased commencing the beginning of mode 3 (illustrated in FIG. 41).

Figure 40:
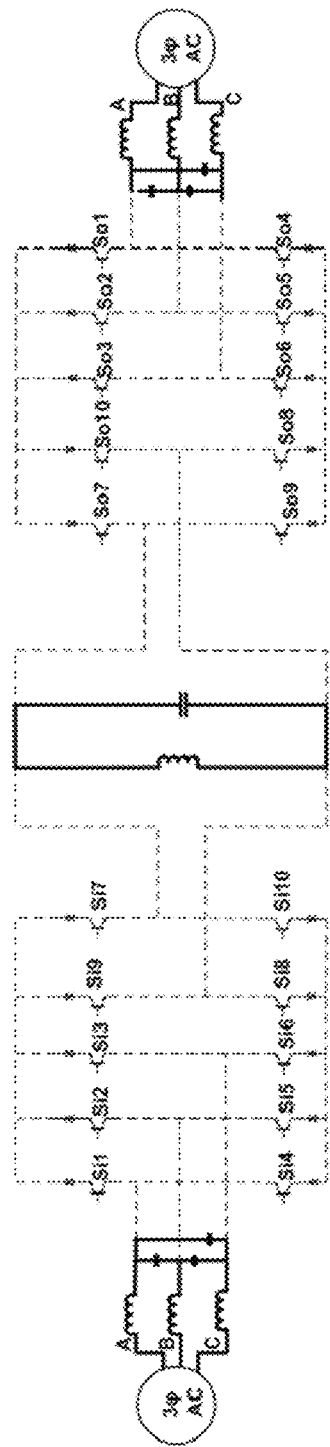
Figure 41:
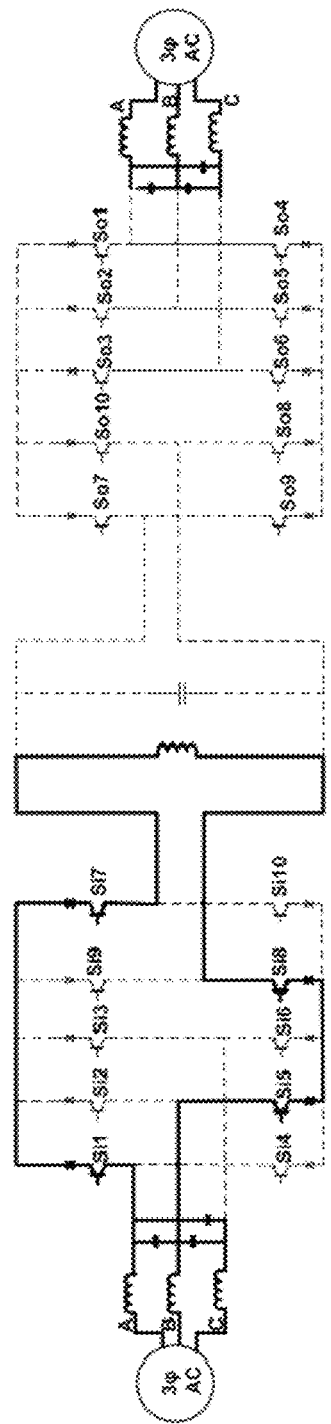
Figure 42:
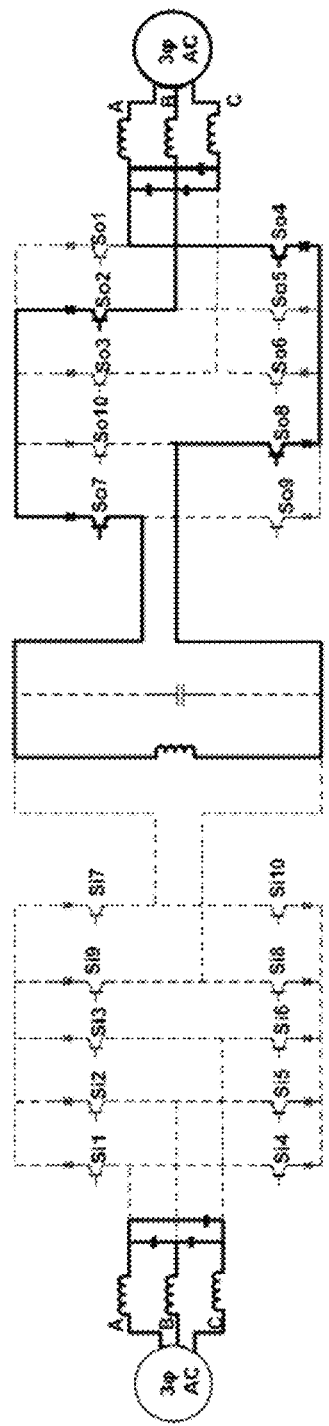
Figure 43:
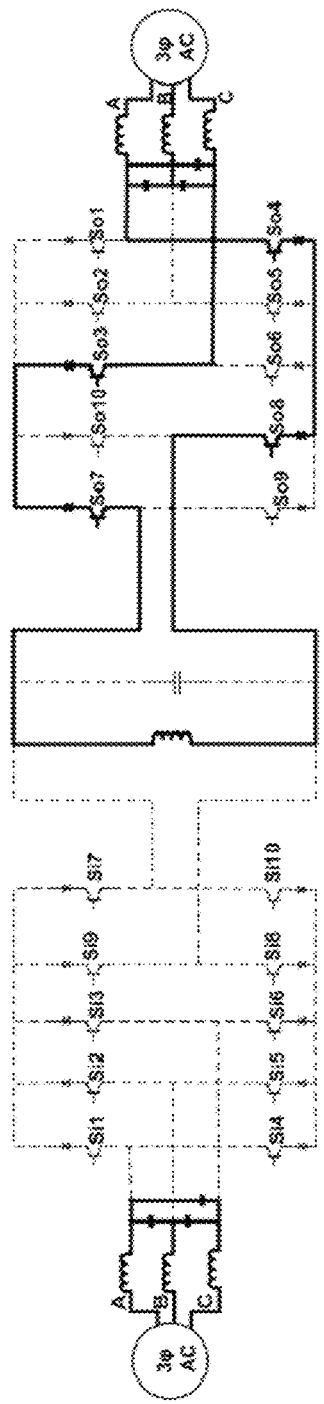

During mode 3, the link will again be charged, and once phase B meets its current reference or the link current reaches a predetermined value (depending on the control strategy) the input switches will be turned off commencing the start of mode 4, which is another resonating mode. Mode 4 is also illustrated by FIG. 40. During mode 4, the switches which are supposed to conduct during modes 5 and 7 are enabled, however they will not conduct because they are reversed biased. During mode 4 the link voltage will decrease, and its polarity will change. Once the absolute value of link voltage becomes equal to the absolute value of the output voltage between phases A and B (i.e., |V_AB_o|), assuming the magnitude of the voltage across the output phase pair AC is higher than the magnitude of the voltage across the output phase pair AB, the output switches So2, So4, So7, and So8 are forward biased and will start to conduct. This marks the beginning of mode 5 (illustrated in FIG. 42).

During mode 5, the link will be discharged into the output phase pairs. Once phase B meets its reference, So2 will be turned off, and the link will resonate (initiating mode 6). Like the other resonating modes, mode 6 is illustrated in FIG. 40. Once the absolute value of link voltage becomes equal to the absolute value of the phase A-C output voltage (i.e., |V_AC_o|), So3 will be forward biased and will conduct. This marks the beginning of mode 7 (illustrated in FIG. 43). Once the energy stored in the link is enough for the link to resonate to a predetermined maximum voltage (larger than each line to line input or output voltage), all the switches will be turned off, and the link will resonate. This marks the beginning of another resonating mode (mode 8, illustrated in FIG. 40). After reaching the maximum value the link voltage starts to decrease due to the change in the polarity of the link current.

Once the link voltage becomes equal to absolute value of the phase A to phase B input voltage (i.e., |V_AB_i|), input switches Si1, Si6, Si9 and Si10 will conduct, initiating mode 9. Modes 9-16 are similar to modes 1-8, except that the polarity of link current has changed. Therefore switches Si9, Si10, So9 and So10 will conduct instead of Si7, Si8, So7 and So8.

In the above case, the transition from mode 7 to 8 can occur before the point that was mentioned above. The excess energy due to the current remained in the link inductor in this case can be directed back into the input by turning on the proper switches.

Additionally, the topology described in the preceding paragraphs can be constructed to have a one or more additional intermediate crossover switching circuit coupling either an additional source or additional load to the system. The additional source and/or load may also have accompanying switch bridges operating generally as described above. As will be understood, this can be used to facilitate connections between one or more power sources and one or more loads in the same general manner as set forth above. Moreover, for each input or output of the circuit, a shunt capacitor presenting a low-impedance voltage source may be provided. Furthermore, the reactive component can be a transformer.

Figure 12:
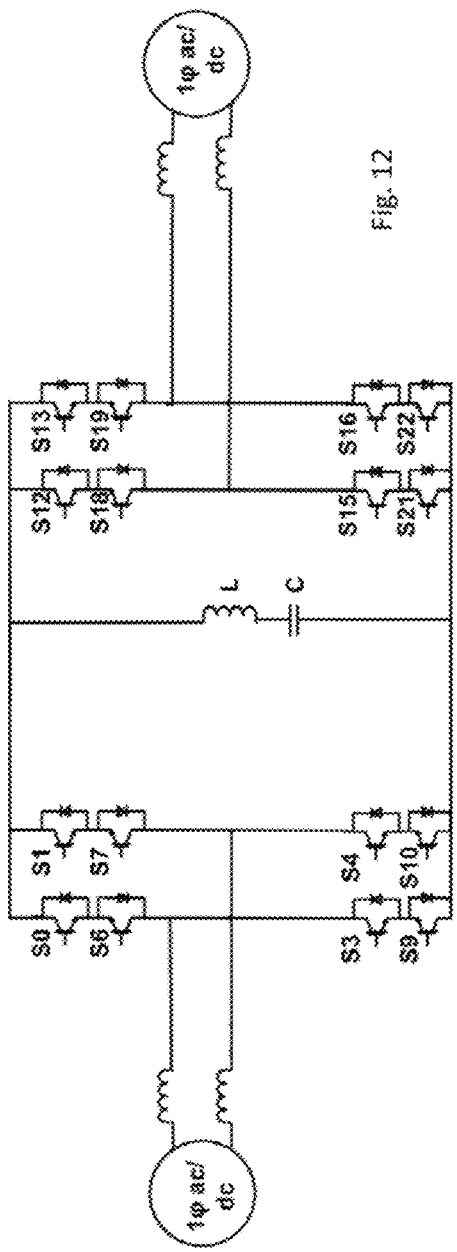
FIG. 12 shows a DC or single-phase AC to DC or single-phase AC power conversion circuit employing a series partially resonant link with bidirectional switches making up the input and output switch bridges which are in parallel with the link.
Figure 15:
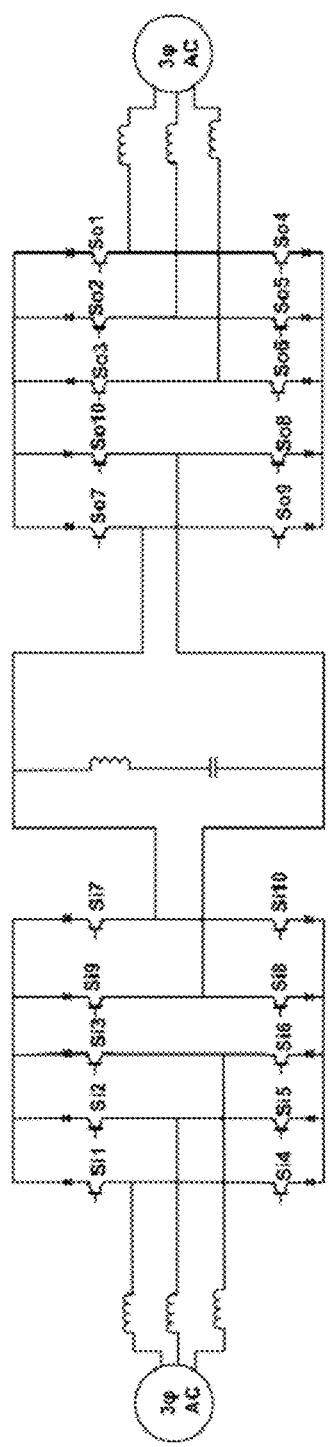
Figure 16:
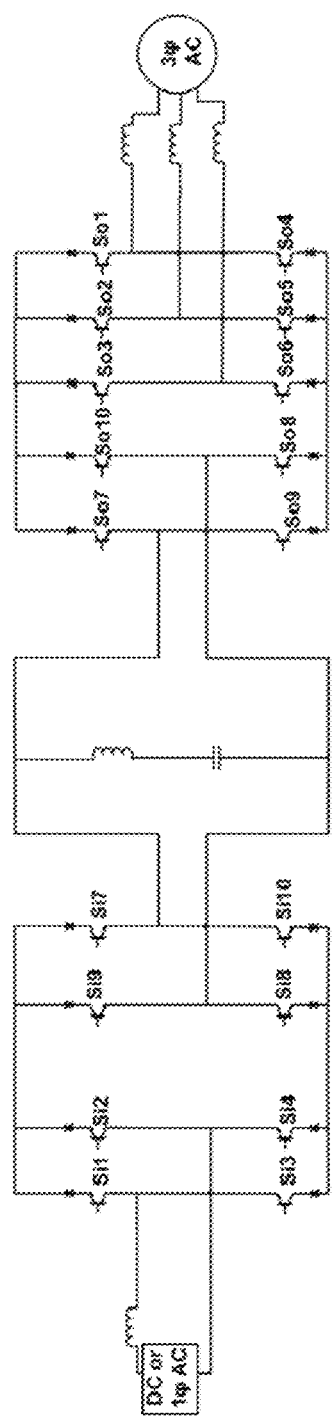
Figure 19:
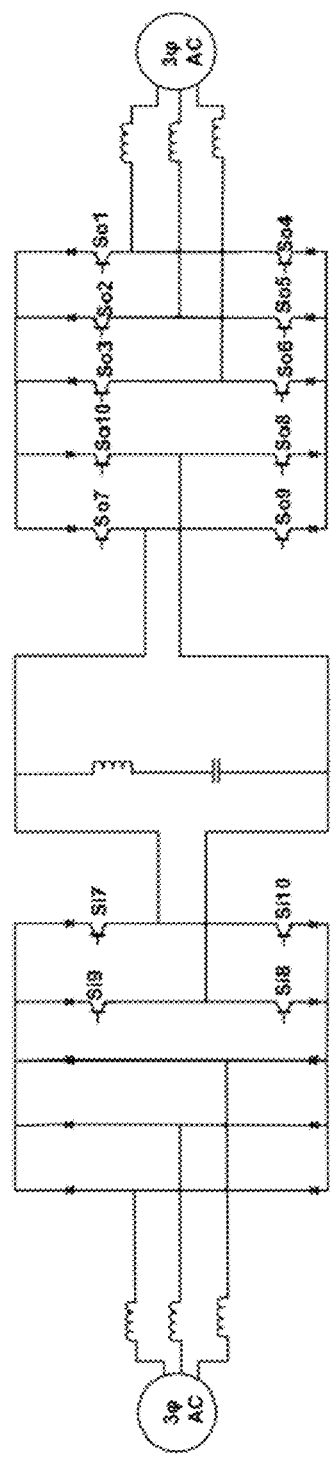
Figure 20:
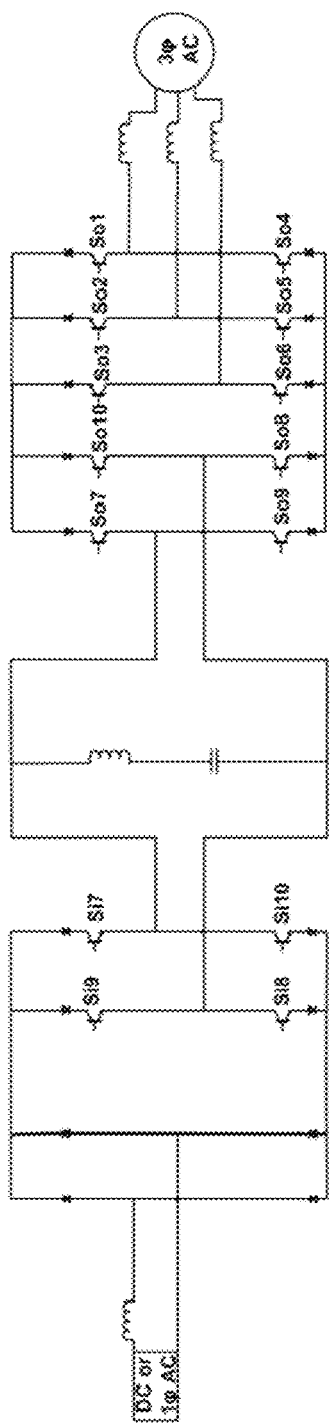
Figure 35:
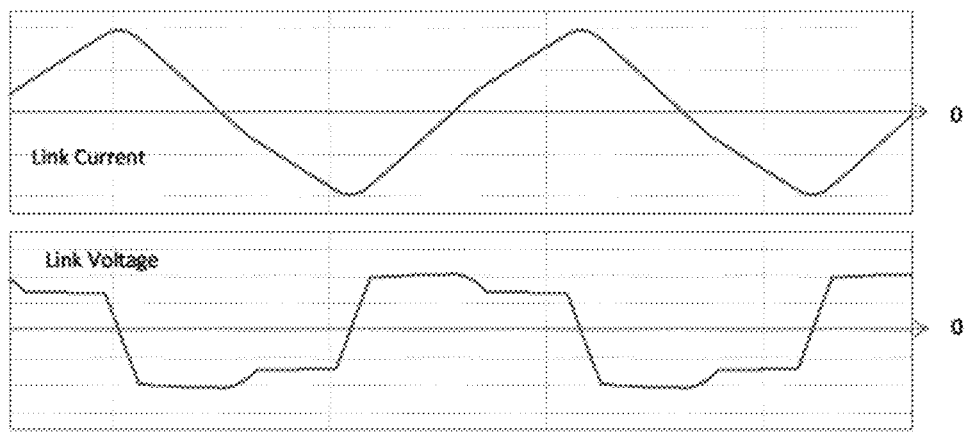
FIG. 35 illustrates link current and voltage waveforms for operation of a power conversion circuit employing a parallel partially resonant link.
Figure 44:
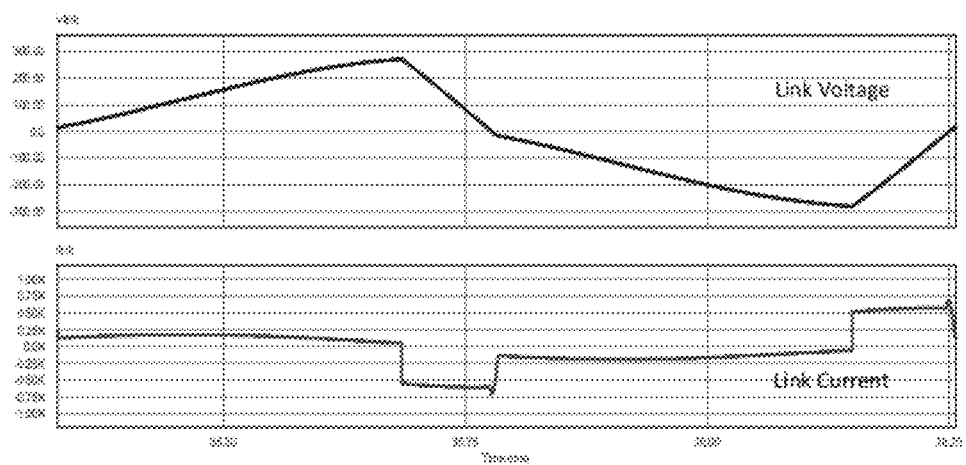
FIG. 44 illustrates voltage and current waveforms for operation of a power conversion circuit employing a series partially resonant link placed in parallel with input and output switch bridges.
Figure 55:
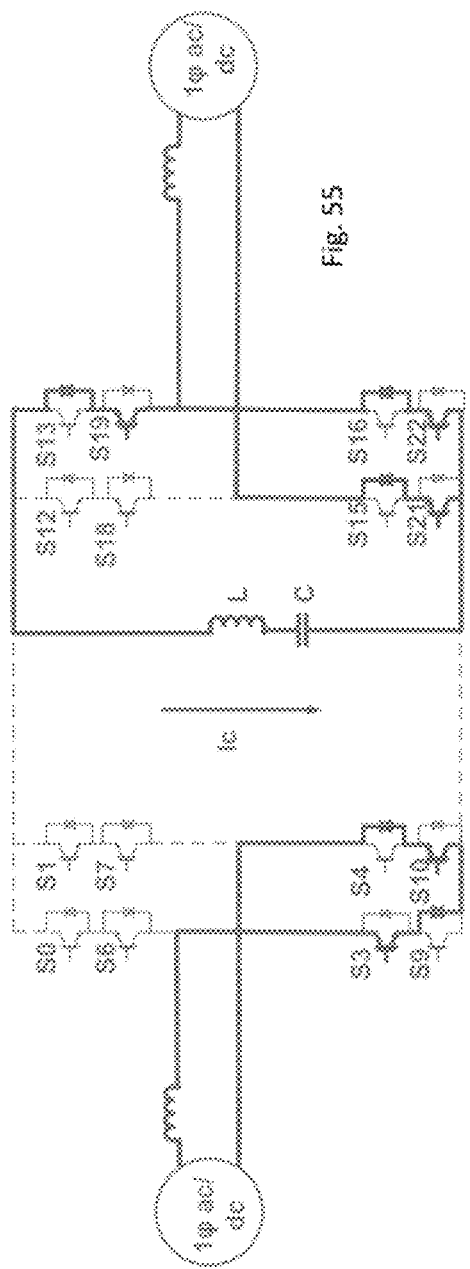
Figure 56:
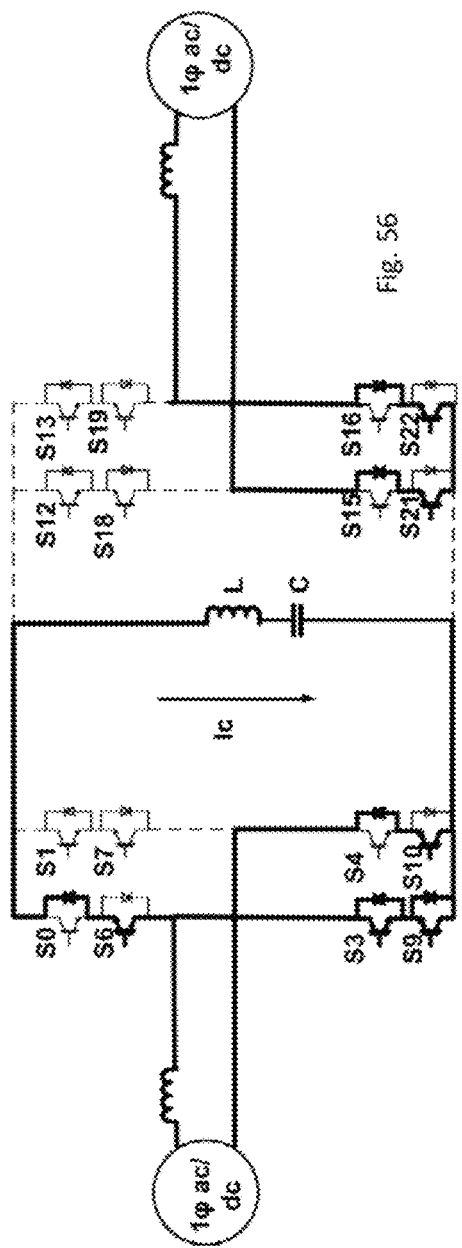
Figure 57:
FIG. 57 illustrates link voltage, link current and input and output phase current waveforms for operation of a three phase AC to three phase AC power conversion circuit employing a series partially resonant link placed in parallel with input and output switch bridges.

Operation of the series-partially resonant link topology illustrated in FIGS. 11-22 will now be illustrated with respect to FIGS. 44-63. With reference to FIG. 12, for example, it can be seen that this converter is essentially a step up/step down converter. In such an arrangement, the link capacitor C stores the energy during transfer from the input to the output. In each cycle this capacitor can be charged through the input, and then it can be discharged into the output. Between each charging and discharging there will be a resonating mode. This resonating mode can facilitate the zero current turn off or zero voltage/current turn on of the switches. Moreover, the switches can have soft turn on due to the existence of input/output inductances. Because the inductor L is only used for resonance with the capacitor, its inductance can be relatively small. In this converter the current and voltage of the capacitor (Vlink and Ilink) are AC (as illustrated in FIG. 44). Use of an AC capacitor, instead of expensive, bulky, and unreliable electrolytic DC capacitors, can reduce the cost and size of the device while simultaneously increasing the reliability.

Exemplary operation of the circuit to produce the link currents and voltage illustrated in FIG. 44 may be understood with reference to FIGS. 45-56, which illustrate the sequence of switch operation for a DC-DC case. The operating sequence comprises a series of 8 operating modes, each corresponding to various positions of the switches in both the input stage and the output stage.

In a first mode, illustrated in FIG. 45, the link capacitor can be charged through the input by turning on switches S6 and S10, thereby discharging the input line inductor(s). Meanwhile, the output line inductor(s) can also be discharged into the output load by turning on output switches S21 and S16, which permits a path for this current to flow through the load. When the input current reaches its reference value (as specified by the controller) or the link voltage reach a predetermined value (depending on the control strategy), mode 2 (illustrated in FIGS. 46 and 47) can be initiated.

Mode 2 has two stages, a first stage (illustrated in FIG. 46) corresponding to a decay of the link current to zero and a second stage (illustrated in FIG. 47) corresponding to the reversal of the link current, which can be redirected into the load. Turn on of input switch S1 short circuits the series-resonant LC link, marking the beginning of the first stage of mode 2. This results in a decrease of the link current while maintaining a current path for the source, which charges the input inductors. Once the link current reaches zero, the second stage of mode 2 can be initiated by turning off switch S10 and turning on switch S12. The closing of switch S12 permits the output switches to carry the link current (which has now reversed) to the load. Turning off switch S10 disconnects the source from the link but maintains the current flow, thereby charging the input inductors. Because the turn off of switch S10 occurs as the link current reaches zero (i.e., zero current turn off), the circuit can operate more efficiently and less stress is placed on the switch.

Once the link current becomes equal to the output current, mode 3 (illustrated in FIG. 48) can be initiated by the turn off of switch S21 (again a zero current turn off). During mode 3 the link can be discharged into the output, with both the input and output line inductors charging. Once the energy remained in the link capacitor is enough to reach a predetermined maximum current which is larger than both input and output line currents, mode 4 can be initiated.

Again mode 4 (illustrated in FIGS. 49 and 50) has two stages and the first stage can be initiated by turn on of S13. This short circuits the series resonant link, causing the link current to decrease until it reaches the maximum current (since the link current is negative its value will increase while it is decreasing). At this point the polarity of voltage across the inductor changes and the current starts to increase (the magnitude will decrease). Once the current becomes equal to the output current the second stage of mode 4 starts (as illustrated in FIG. 50). At the beginning of this stage S13 will be turned off (zero current turn off) and S19 will be turned on (zero voltage and current turn on), S16 will be turned off and later on it will be shown that it has zero current and voltage turn on (similar to S19), S0 and S3 will be turned on (S0 will have zero current and voltage turn on). The link is shorted through input switches, so the link current continues to increase (its value will decrease) until it becomes equal to input current. At that point, mode 5 (illustrated in FIG. 51) can be initiated by turning off output switch S0 and S6 (again a zero current turn off). Modes 5-8, illustrated in FIGS. 51-56 are similar to modes 1-4, except that the polarity of the link voltage is reversed. In the above mentioned description it was assumed that the output current is larger than the input, however the circuit still works for the case that input current is larger than output current. Of course in this case switching is slightly different.

The same principle of operation can be extended to the single phase and three phase AC cases. The single phase AC case can be considered exactly the same as the DC case described above because in each half cycle the input voltage can be considered to be constant. When the polarity of the voltage changes (i.e., each half cycle) the proper switches can be selected to have the same operation as the DC case as described above.

In the three phase AC case, the phase that is instantaneously carrying maximum current can be identified. In FIGS. 57-63 it is assumed that phase A (in both input and output) is carrying the maximum current. The corresponding switching arrangements for the other phases may be similarly understood by analogy to those expressly described.

Figure 58:
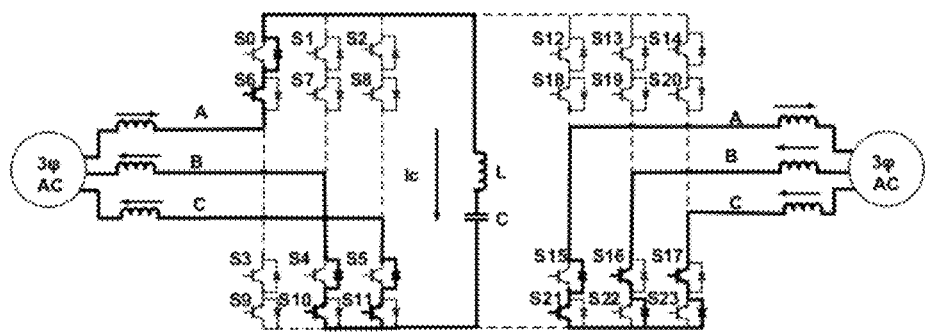
FIGS. 58-63 illustrate the switching sequence for operation of a three-phase to three-phase power conversion circuit employing a series partially resonant link placed in parallel with input and output switch bridges.
Figure 59:
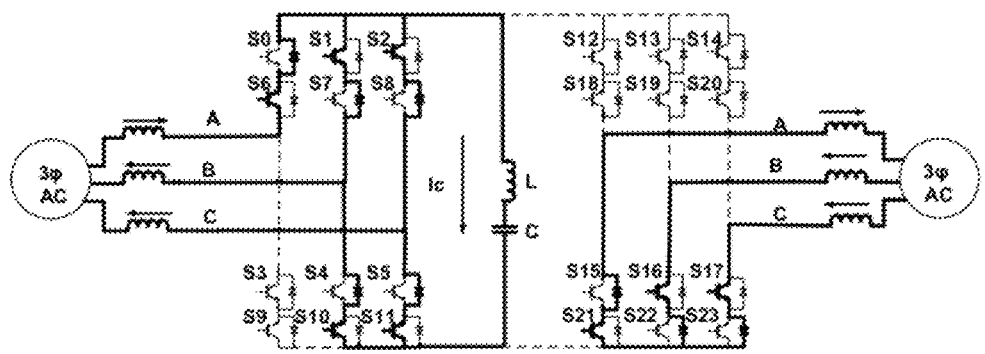
Figure 60:
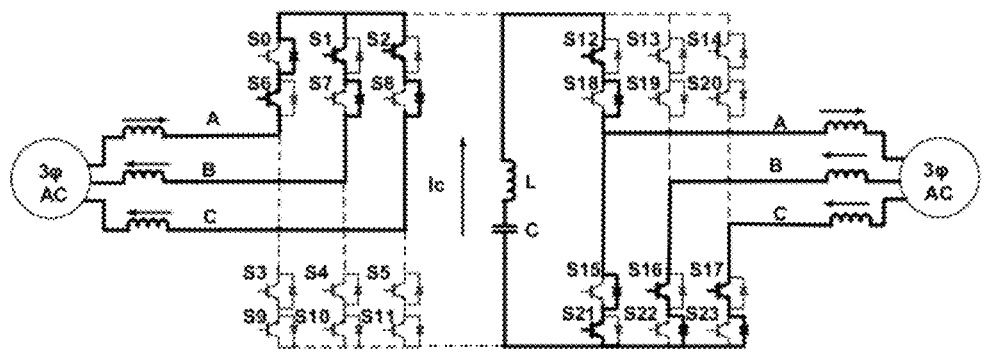
Figure 61:
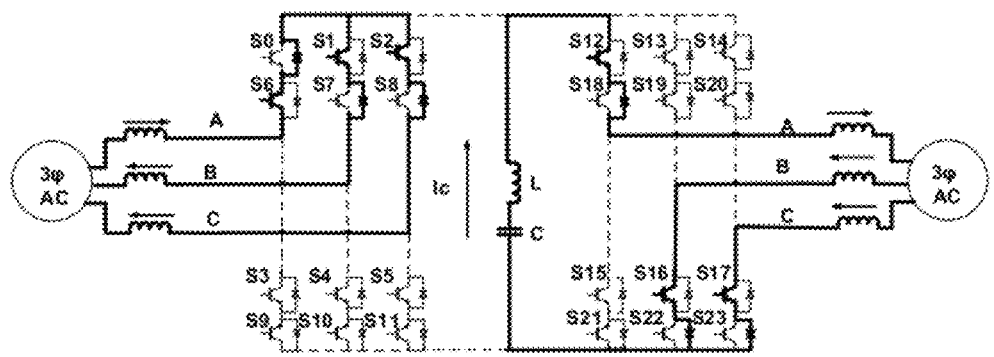
Figure 62:
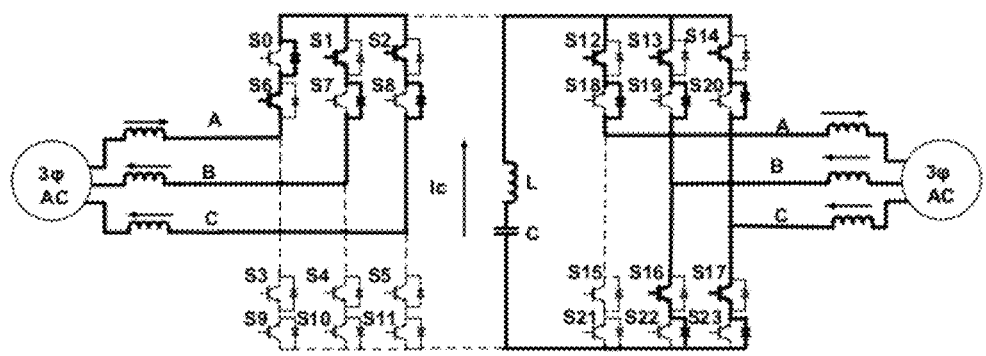
Figure 63:
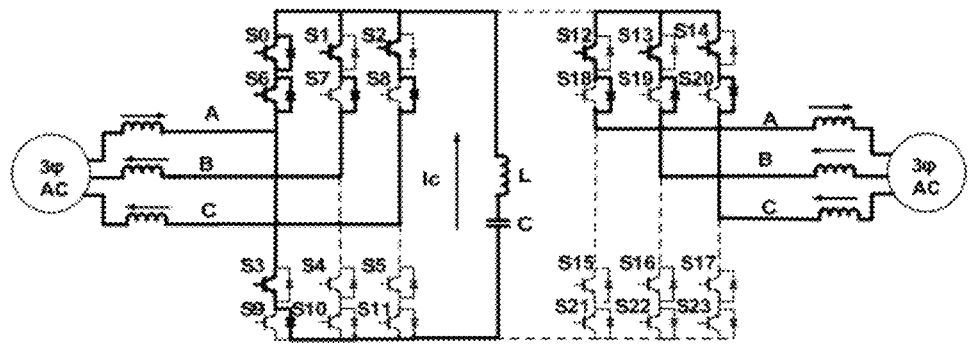

In a first mode, illustrated in FIG. 58, the link capacitor can be charged through the input by turning on switches S6, S10, and S11 thereby discharging the input line inductor(s). Meanwhile, the output line inductor(s) can also be discharged by turning on output switches S21, S16, and S17 which permits a path for this current to flow through the load. When the input current reaches its reference value (as specified by the controller), or the link voltage reaches to its predetermined peak value (depending on the control method) mode 2 (illustrated in FIGS. 59 and 60) can be initiated.

Mode 2 has two stages, a first stage (illustrated in FIG. 59) corresponding to a decay of the link current from maximum input current to zero and a second stage (illustrated in FIG. 60) corresponding to the reversal of the link current, which can be redirected into the load. Turn on of input switches S1 and S2 short circuits the series-partially resonant LC link, marking the beginning of the first stage of mode 2. This results in a decrease of the link current while maintaining a current path for the source, which charges the input inductors. Once the link current reaches zero, the second stage of mode 2 can be initiated by turning off switches S10 and S11 and turning on switch S12. The closing of switch S12 permits the output switches to carry the link current (which has now reversed) to the load. Turning off switches S10 and S11 disconnects the source from the link but maintains the current flow, thereby charging the input inductors. Because the turn off of switches S10 and S11 occurs as the link current reaches zero (i.e., zero current turn off), the circuit can operate more efficiently and less stress is placed on the switch.

Once the link current being redirected to the load becomes equal to the output current, mode 3 (illustrated in FIG. 61) can be initiated by the turn off of switch S21 (again a zero current turn off). During mode 3 the link can continue to be discharged into the output, with both the input and output line inductors charging. Once the energy remained in the link is sufficient for the link current to reach to a predetermined maximum value, mode 4 can be initiated.

Mode 4 (illustrated in FIGS. 62 and 63) has two stages, the first stage can be initiated by turn on of switches S13, S14, S19 and S20. This short circuits the series resonant link, causing the link current to decrease (the magnitude will increase) until it becomes equal to the maximum value. At that point the polarity of the capacitor voltage and consequently the polarity of inductor voltage reverses. Therefore, the current starts to increase (the magnitude will decrease). Once the link current becomes equal to maximum phase current of output, the second stage of mode 4 starts. At this point, S13 and S14 will be turned off (zero current turn off), S16 and S17 will be turned off (they have zero current and voltage turn on) and S0 and S3 at input side will be turned on (S0 has zero current and voltage turn on). Link current will continue to decay due to the short circuit made by the input switches. Once the link current becomes equal to maximum input current, mode 5 (not shown) can be initiated by turning off switches S0 and S6 (again a zero current turn off). Modes 5-8 are similar to modes 1-4 except that the polarity of the link changes. Operation continues similarly to that described above for the DC/single phase case for each of the remaining phases.

For each input or output of the circuit, a series inductor presenting a high-impedance current source may be provided. Furthermore, the reactive component can be a transformer.

Figure 64:
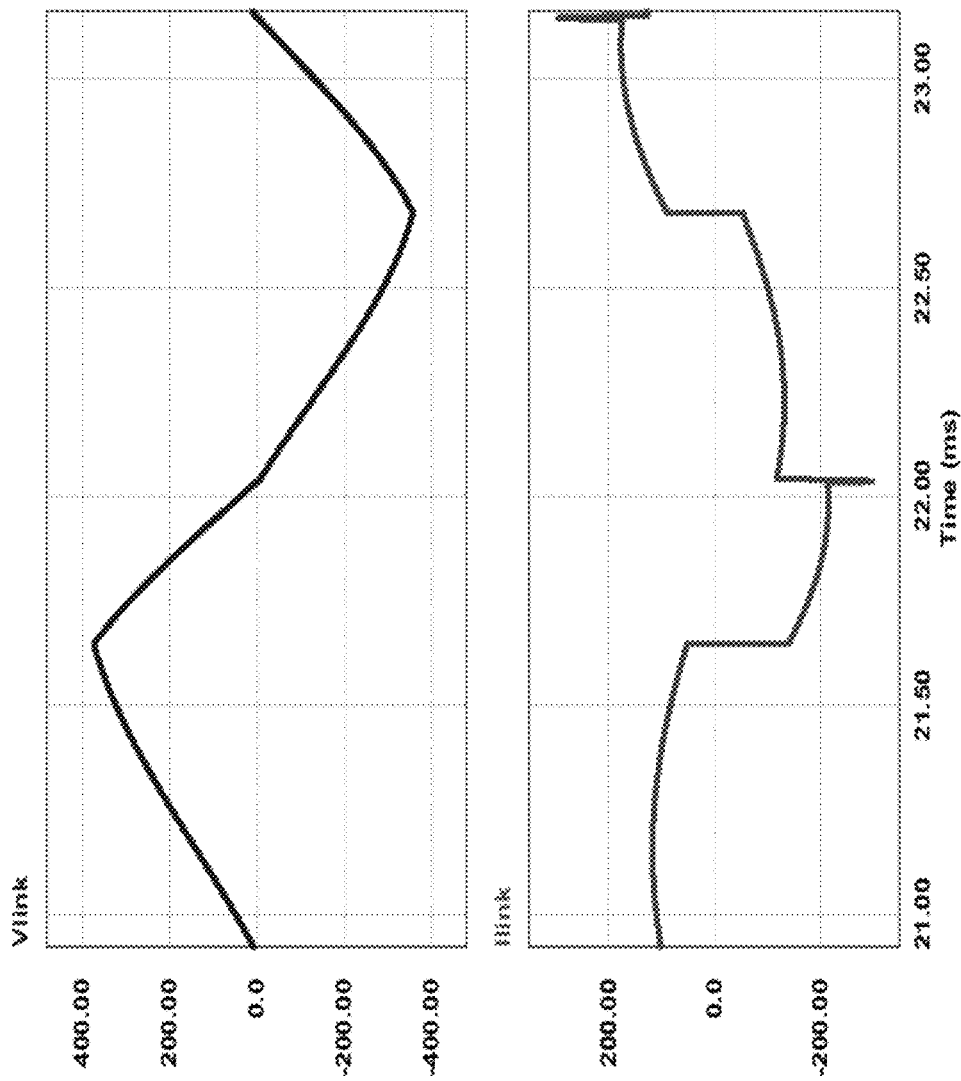
FIG. 64 illustrates voltage and current waveforms for operation of a power conversion circuit employing a series partially resonant link placed in series with input and output switch bridges.

Operation of topology employing the series-partially resonant link placed in series with input and output switch bridges illustrated in FIGS. 23-34 will now be illustrated with respect to FIGS. 64-84. With reference to FIG. 24, for example, it can be seen that this converter is essentially a step up/step down converter. In such an arrangement, the link capacitor C stores the energy during transfer from the input to the output. In each cycle this capacitor can be charged through the input, and then it can be discharged into the output. Between each charging and discharging there will be a resonating mode. This resonating mode can facilitate the zero current turn off of the switches. Moreover, the switches can have soft turn on due to the existence of input/output inductances. Because the inductor L is only used for resonance with the capacitor, its inductance can be relatively small. In this converter the current and voltage of the capacitor (Vlink and Ilink) are AC (as illustrated in FIG. 64). Use of an AC capacitor, instead of expensive, bulky, and unreliable electrolytic DC capacitors, can reduce the cost and size of the device while simultaneously increasing the reliability.

Exemplary operation of the circuit to produce the link currents and voltage illustrated in FIG. 64 may be understood with reference to FIGS. 65-74, which illustrate the sequence of switch operation for a DC-DC case. The operating sequence comprises a series of eight operating modes, each corresponding to various positions of the switches in both the input stage and the output stage.

Figure 65:
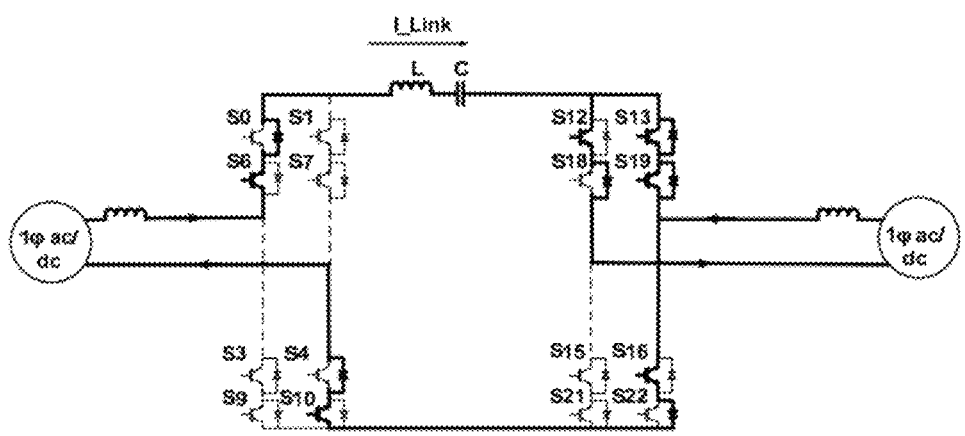
FIGS. 65-74 illustrate the switching sequence for operation of a DC or single phase to DC or single phase power conversion circuit employing a series partially resonant link placed in series with input and output switch bridges.
Figure 66:
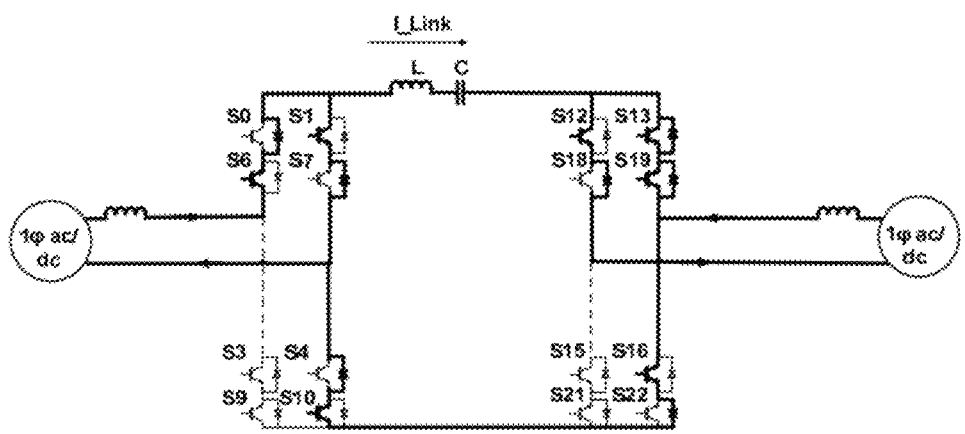
Figure 67:
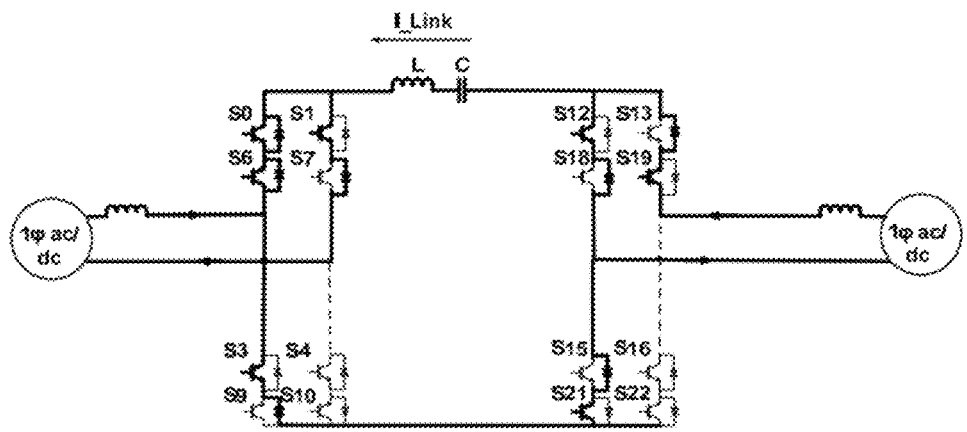
Figure 68:
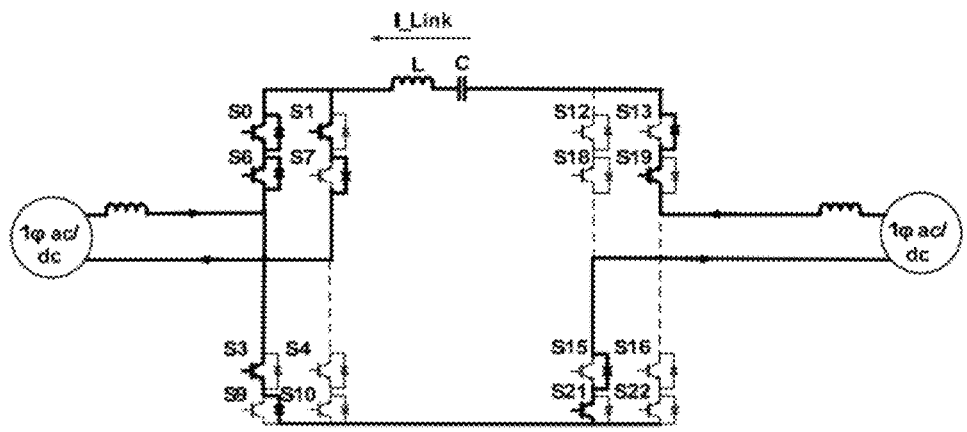
Figure 69:
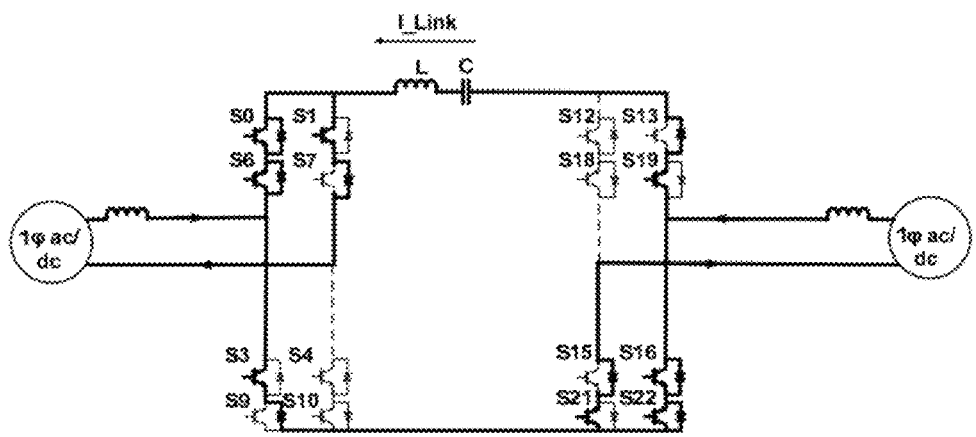
Figure 70:
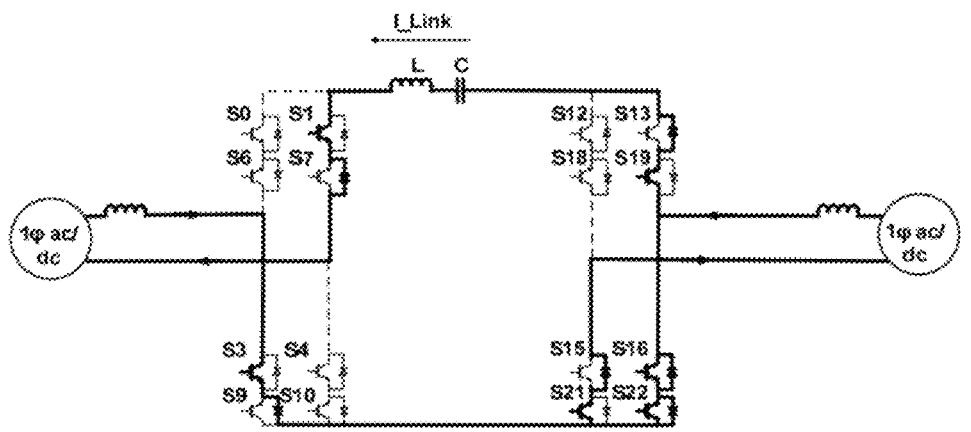
Figure 71:
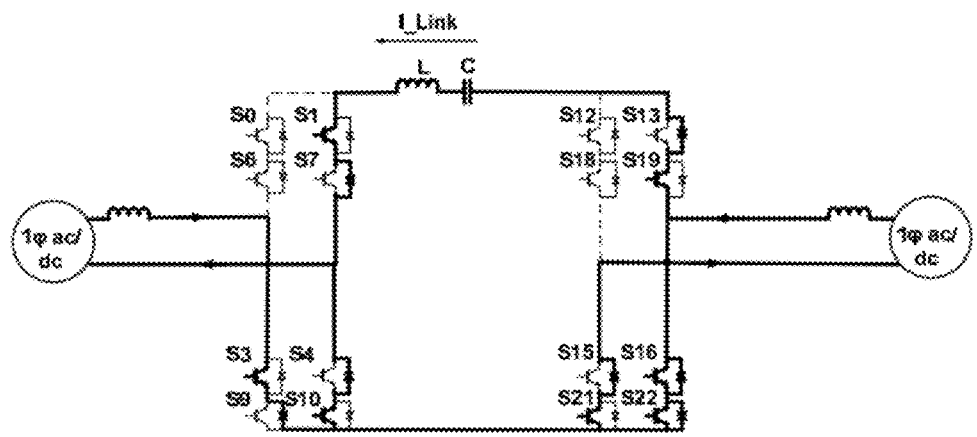
Figure 72:
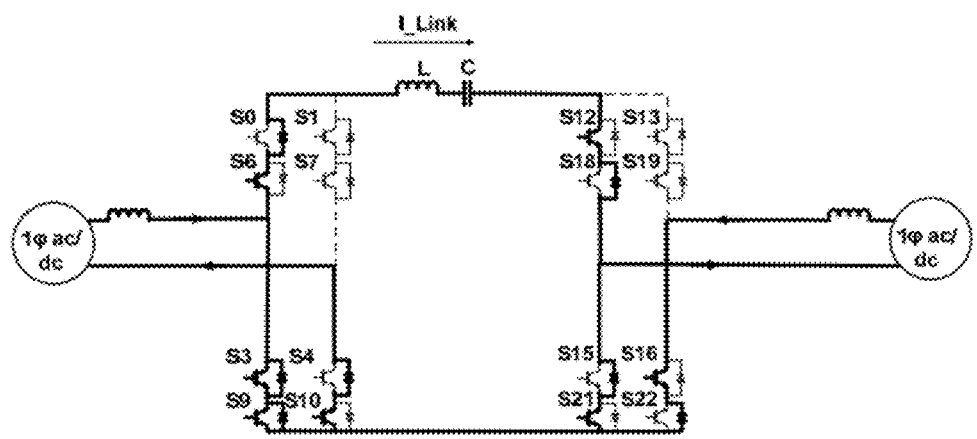
Figure 73:
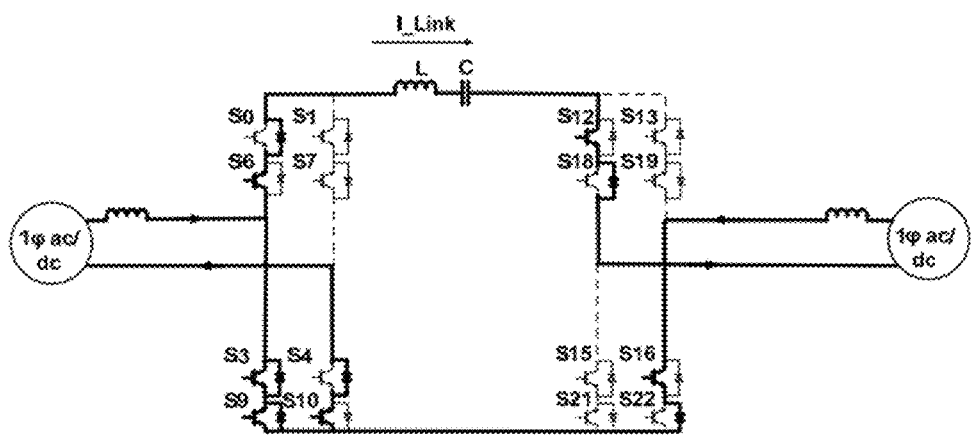
Figure 74:
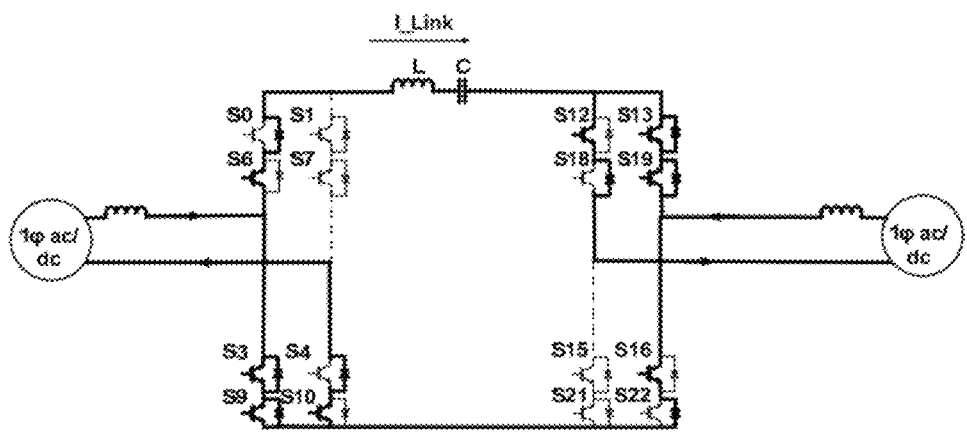

In a first mode, illustrated in FIG. 65, the link capacitor can be charged through the input by turning on switches S6, S10, S13, S19 and S16, thereby discharging the input line inductor(s). Meanwhile, the output line inductor(s) can also be discharged by turning on output switches S12, which permits a path for this current to flow through the load. When the input current reaches its reference value (as specified by the controller) or the link voltage reaches a predetermined value (depending on the control strategy), mode 2 (illustrated in FIGS. 66 and 67) can be initiated.

Mode 2 has two stages, a first stage (illustrated in FIG. 66) corresponding to a decay of the link current from input current to zero and a second stage (illustrated in FIG. 67) corresponding to the reversal of the link current, which can be redirected into the load. Turn on of input switch S1 short circuits the series-resonant LC link, marking the beginning of the first stage of mode 2. This results in a decrease of the link current while maintaining a current path for the source, which charges the input inductors. Once the link current reaches zero, the second stage of mode 2 can be initiated by turning off switches S10 and S16 and turning on switches S0, S3 and S15. Because the turn off of switches S10 and S16 occur as the link current reaches zero (i.e., zero current turn off), the circuit can operate more efficiently and less stress is placed on the switch.

During the second stage of mode 2, the link current continues to decrease and once it becomes equal to the output current, mode 3 (illustrated in FIG. 68) can be initiated by the turn off of switch S12 (again a zero current turn off). During mode 3 the link can be discharged into the output, with both the input and output line inductors charging. Once the energy remained in the link capacitor is enough to reach a predetermined maximum current that is larger than both input and output line currents, mode 4 can be initiated.

Again mode 4 (illustrated in FIG. 69) can be initiated by turn on of S16 and S22. This short circuits the series resonant link, causing the link current to decrease until it reaches the maximum current (since the link current is negative its absolute value will increase while it is decreasing). At this point the polarity of voltage across the inductor changes and the current starts to increase (the magnitude will decrease). Once the current becomes equal to the input current mode 5 (illustrated in FIG. 70) can be initiated by turning off output switch S0 and S6 (again a zero current turn off). Modes 5-8, illustrated in FIGS. 70-74 are similar to modes 1-4, except that the polarity of the link voltage is reversed. In the above mentioned description it was assumed that the output current is larger than the input, however the circuit still works for the case that input current is larger than output current.

The same principle of operation can be extended to the single phase and three phase AC cases. The single phase AC case can be considered exactly the same as the DC case described above because in each half cycle the input voltage can be considered to be constant. When the polarity of the voltage changes (i.e., each half cycle) the proper switches can be selected to have the same operation as the DC case as described above.

Figure 84:
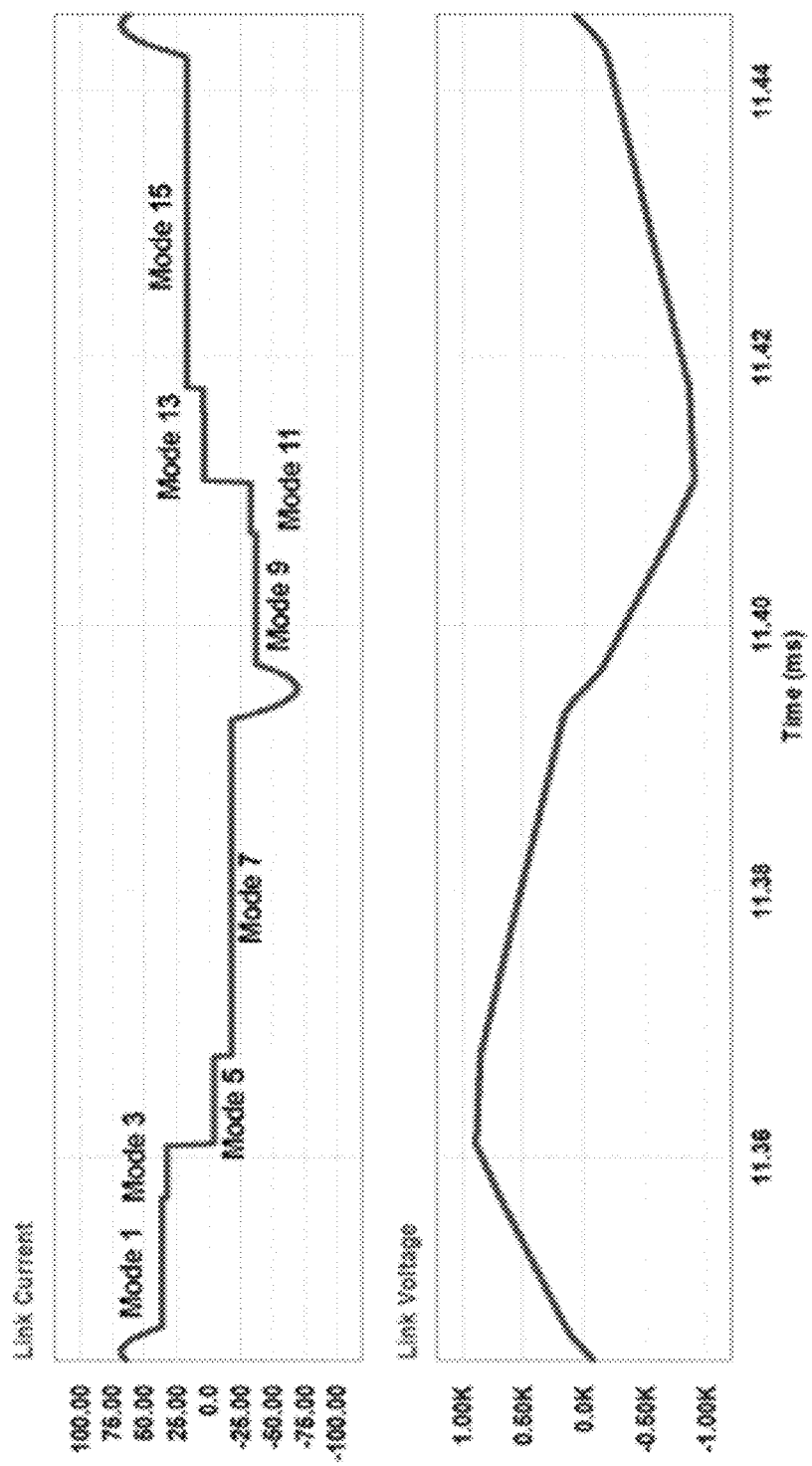
FIG. 84 illustrates current and voltage waveforms for operation of a three phase AC to three phase AC power conversion circuit employing a series partially resonant link placed in series with input and output switch bridges.
Figure 87:
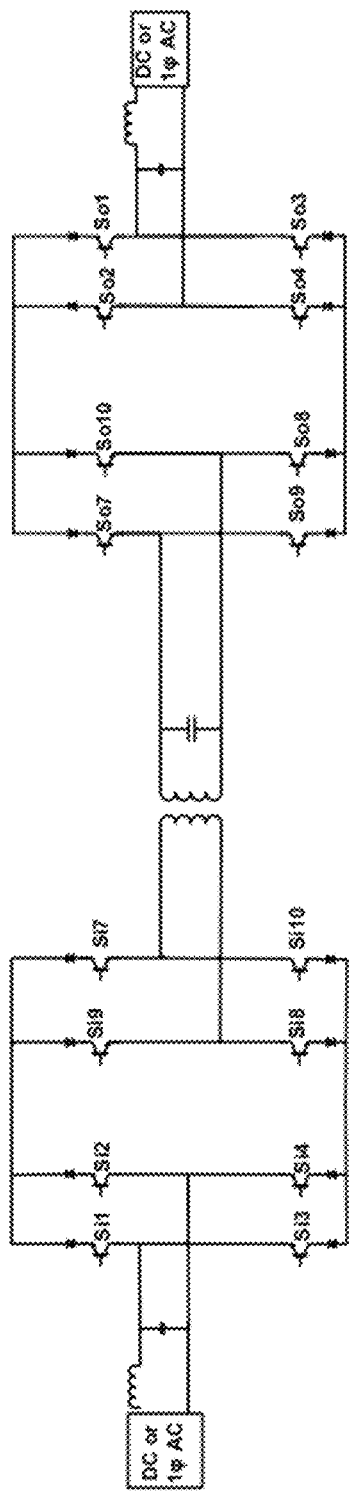
Figure 88:
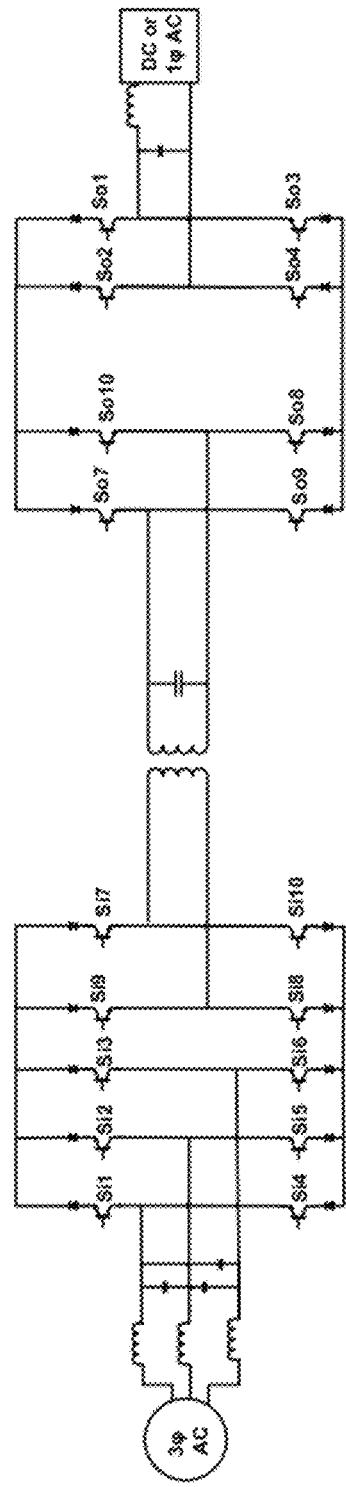
Figure 89:
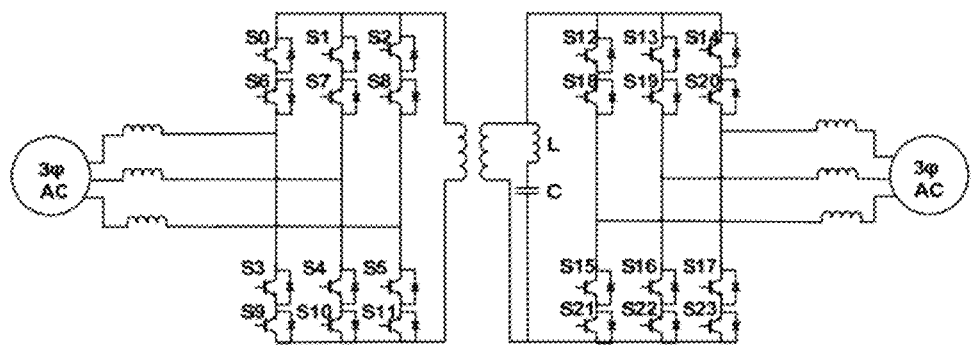
Figure 90:
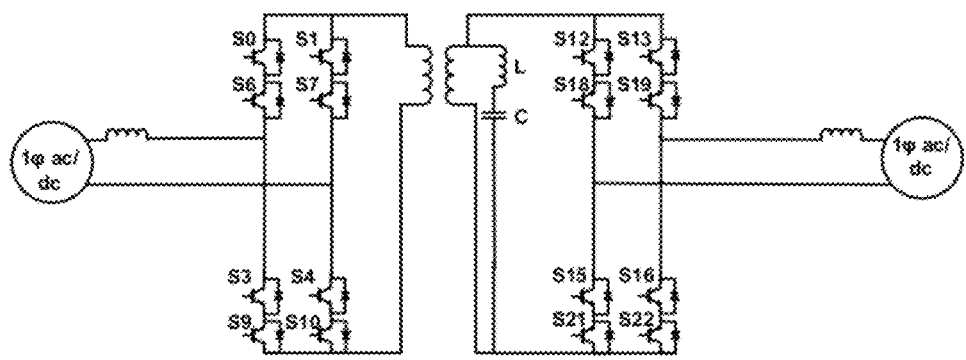
Figure 91:
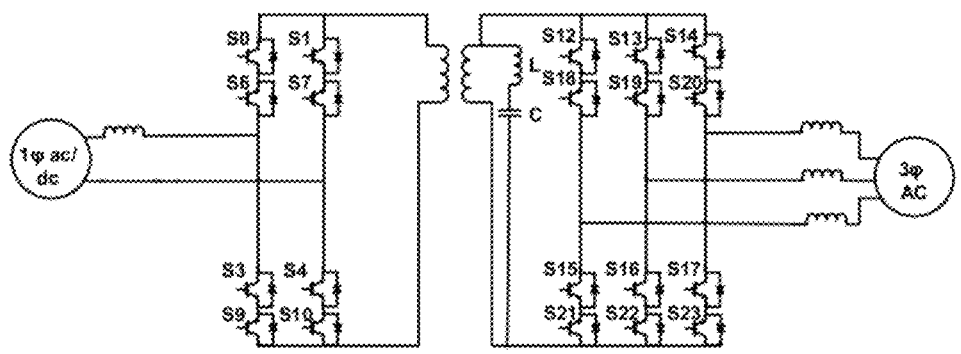
Figure 92:
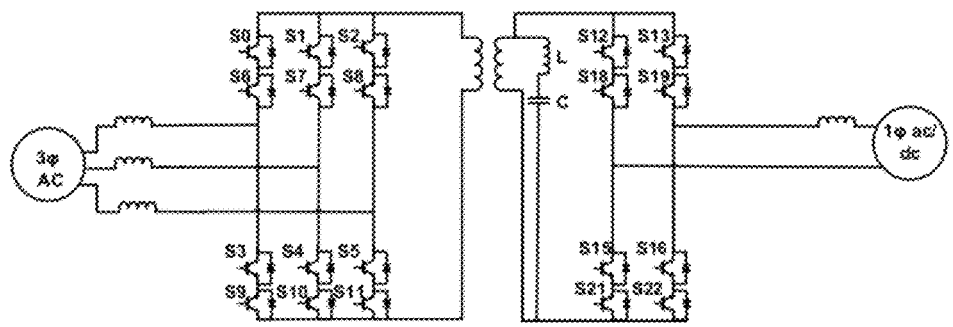
Figure 93:
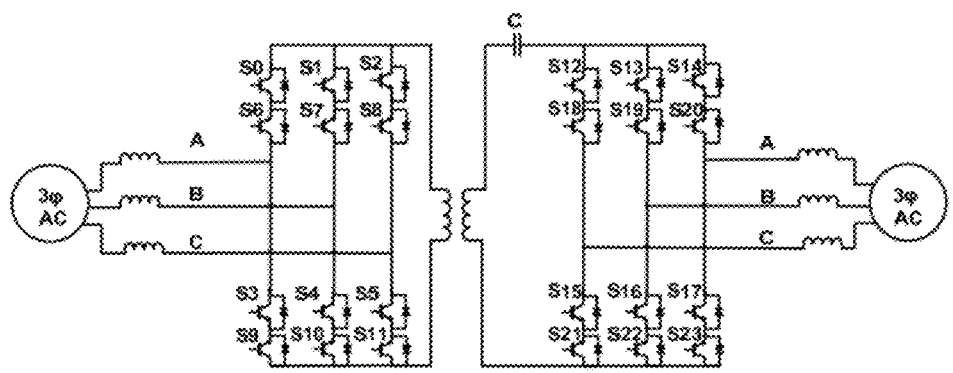
Figure 94:
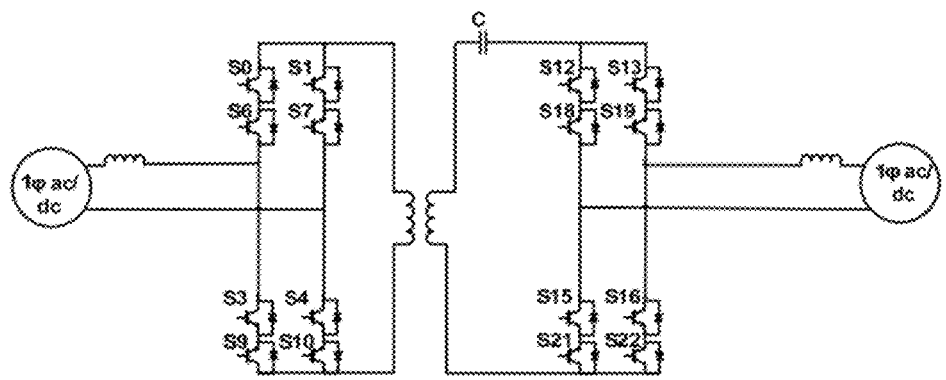
Figure 95:
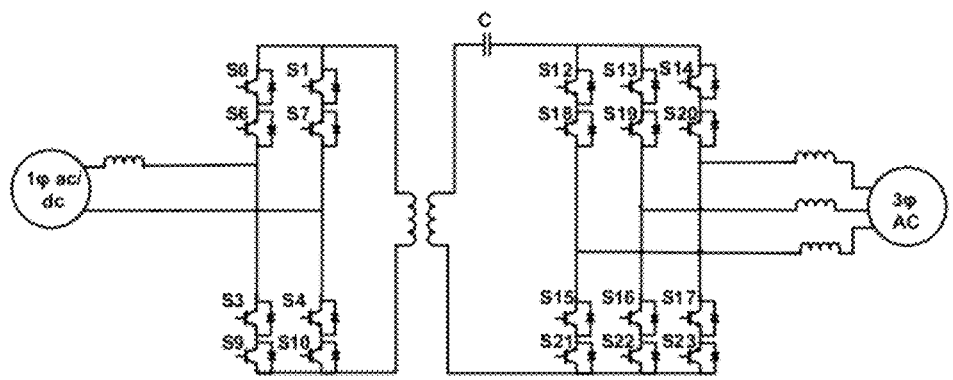
Figure 96:
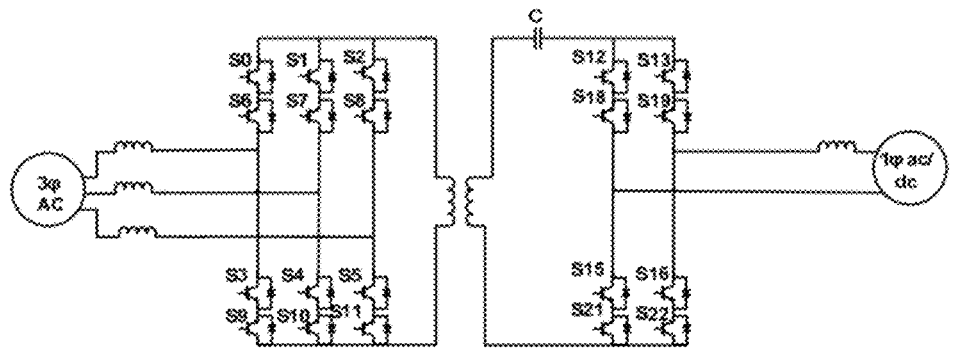

In the three phase AC case, the phase that is instantaneously carrying maximum current can be identified. In FIGS. 75-84 it is assumed that phase A (in both input and output) is carrying the maximum current. The corresponding switching arrangements for the other phases may be similarly understood by analogy to those expressly described. The link capacitor current and voltage are illustrated in FIG. 84.

Figure 75:
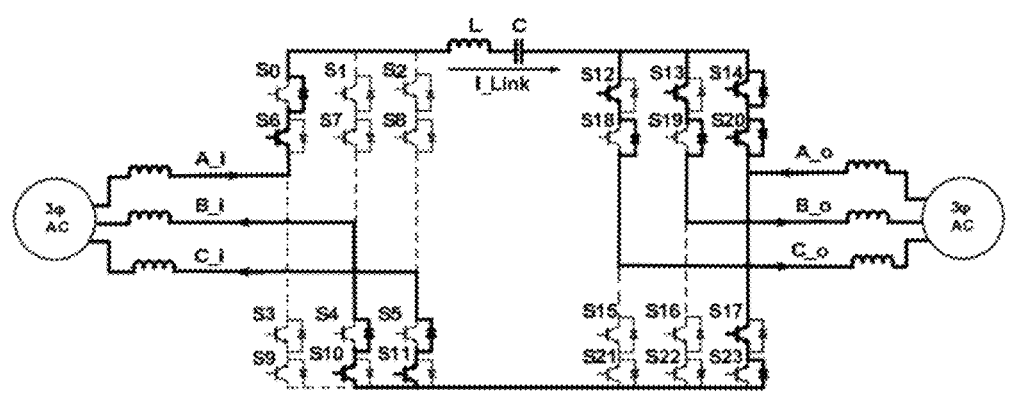
FIGS. 75-83 illustrate the switching sequence for operation of a three-phase to three-phase power conversion circuit employing a partial series resonant link placed in series with input and output switch bridges.

During mode 1, as represented in FIG. 75, the input phase having maximum current (phase A) charges the link capacitor; therefore the link current is equal to Ia_i. Leg "A" at the output switch bridge provides a path for the current flow. The output switch bridge also has to provide a path for the output phase currents. It is assumed that the sum of the output phases currents is zero (IA_O=IB_O+IC_O). Once the voltage across phases A and C on the input side meets its reference, mode 2, a resonating mode starts.

Figure 76:
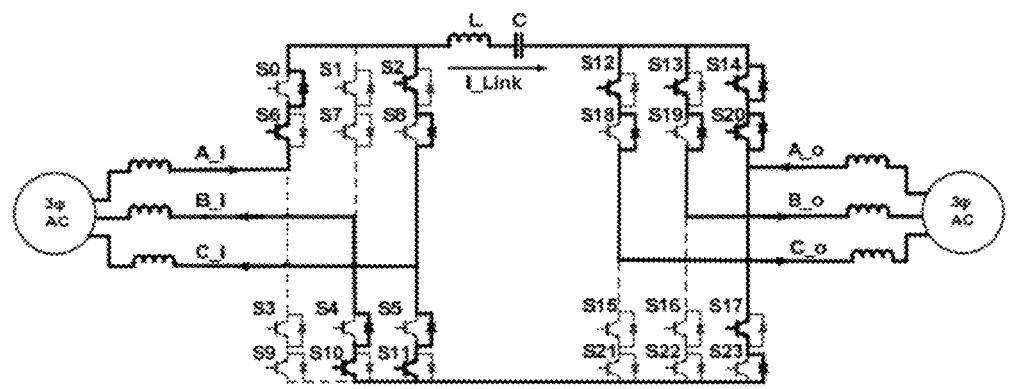

During mode 2, illustrated in FIG. 76, the link is shorted, causing the link current to decrease. Once the link current becomes equal to the current of phase B, no current passes S11. By turning off this switch, mode 3 during which phase B charges the link capacitor is initiated.

Figure 77:
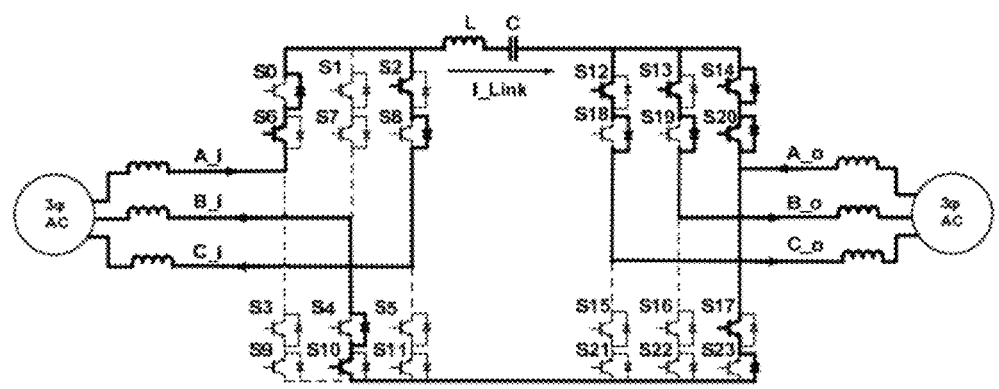
Figure 78:
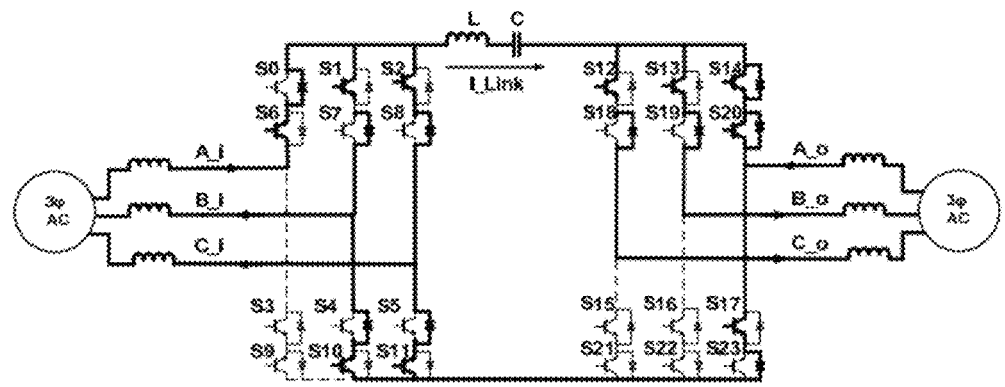
Figure 79:
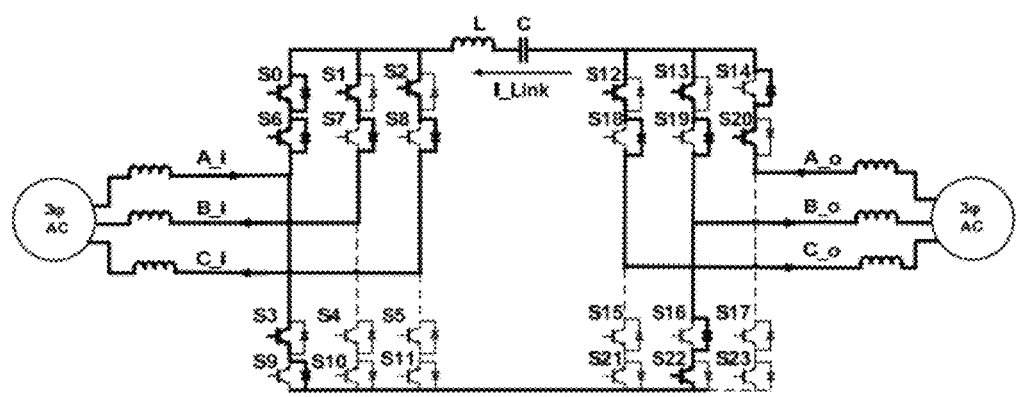

During mode 3, illustrated in FIG. 77, the link capacitor will be charged by phase B input current. Once the voltage across phases B and C meets its reference a resonating mode, mode 4, which includes two stages, illustrated in FIGS. 78 and 79, starts by shorting the link. This will result in the link current decrease and once the link current and, consequently, the current passing through switches S10, S11 and S17 become zero, these switches are turned off and the second stage of mode 4 starts by turning on S3 and S22. This allows the polarity of the link current to be reversed. The link current decreases during this mode and once it becomes equal to the current of phase B at the output side, mode 5 starts by turning off S13, which carries no current at this moment (IA_O=IB_O+IC_O).

Figure 80:
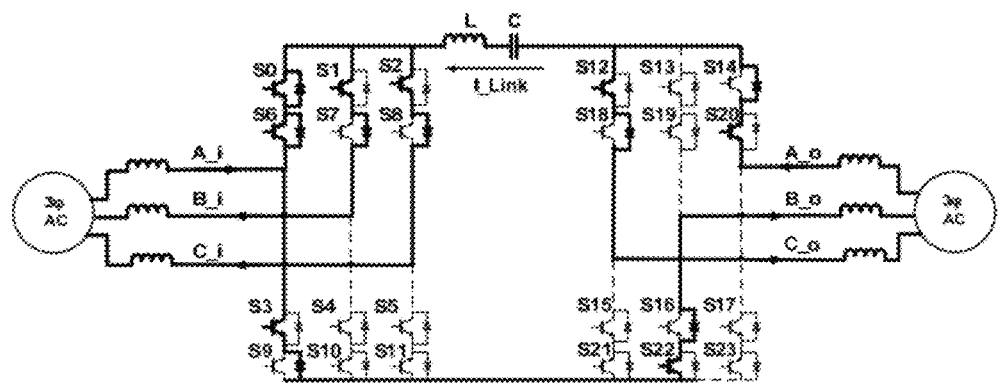

During mode 5, illustrated in FIG. 80, the link is discharged into the output phase B. As soon as the voltage across the output phases B and C meets its reference, mode 6, a resonating mode, is initiated.

Figure 81:
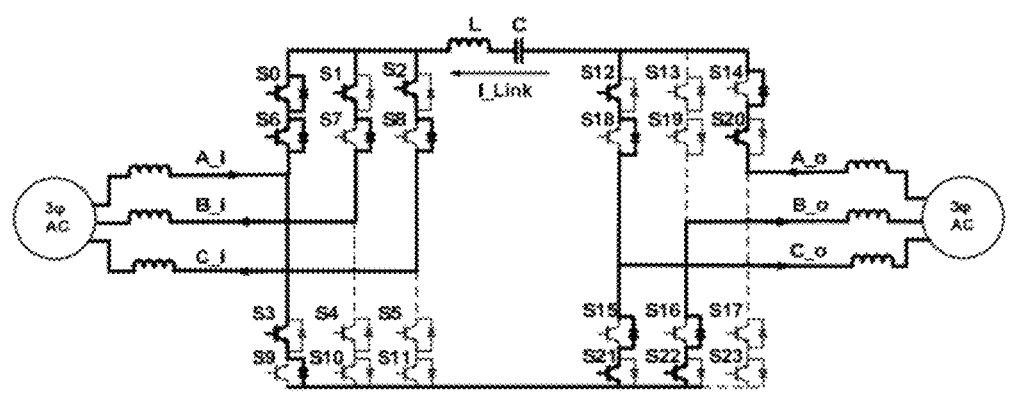

During mode 6, illustrated in FIG. 81, the link current decreases until its absolute value becomes equal to the absolute value of current of phase A at the output side. At this point mode 7 is initiated. Since the link current is negative, while it is decreasing its absolute value is increasing.

Figure 82:
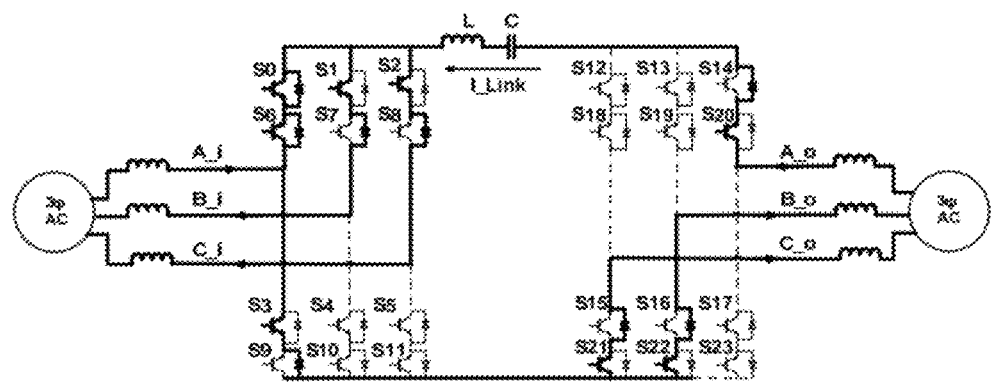
Figure 83:
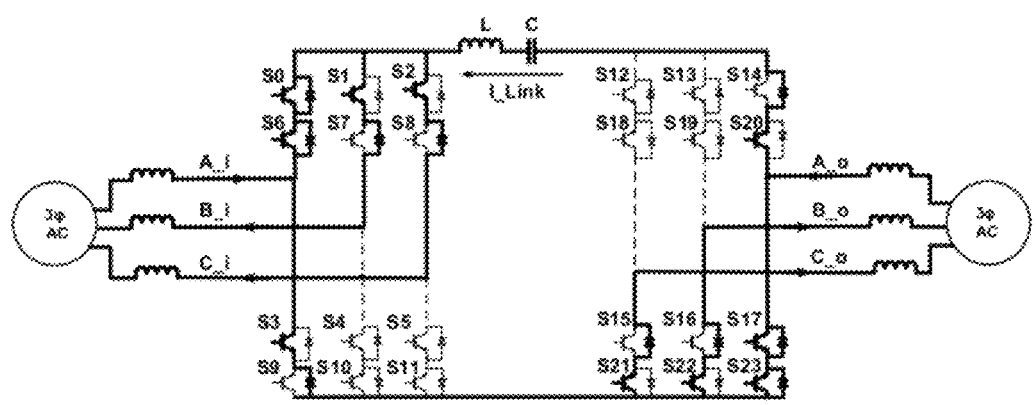

During mode 7, illustrated in FIG. 82, the rest of the energy stored in the capacitor is discharged into the output phase A. Finally, when the stored energy is enough only for the link current to reach to a predetermined value, which is slightly higher than the peak of the input and output, mode 8, illustrated in FIG. 83, starts and the link resonates until its current become equal to phase A at the input side.

Modes 9-16 are similar to modes 1-8, except that the polarity of the link voltage/current is reversed. For this, the complimentary switch in each leg is switched when compared to the ones switched during modes 1 through 8.

As discussed, all the switches are turned off at zero current which results in low switching losses and higher efficiencies.

In the above case the transition from mode 7 to 8 can occur before the point that was mentioned above. The excess energy due to the voltage remained in the link capacitor in this case can be directed back into the input.

Operation continues similarly to that described above for the DC/single phase case for each of the remaining phases. Moreover, for each input or output of the circuit, a series inductor presenting a high-impedance current source may be employed.

Finally, as illustrated in FIGS. 85-96, a transformer may be provided with any of the embodiments described above, thereby providing galvanic isolation between the input and output.

In any of the embodiments described above, it is also possible to have an input switch bridge that is formed by bidirectional switches, and an output switch bridge that includes unidirectional switches and is connected to the partially resonant link through the output intermediate crossover circuit. Similarly, it is also possible to have an output switch bridge that is formed by bidirectional switches, and an input switch bridge that includes unidirectional switches and is connected to the partially resonant link through the input intermediate cross-over circuit.

As an alternative to the bidirectional switches employed in the foregoing embodiments employing a series partially resonant link, a crossover circuit similar to that employed in the parallel partially resonant links described above could be employed in conjunction with the series partially resonant link. Additionally, as set forth above with respect to the first group of embodiments, these later embodiments can also be constructed to have a one or more additional intermediate crossover switching circuits coupling either an additional source or additional load to the system. The additional source and/or load may also have accompanying switch bridges operating generally as described above. As will be understood, this can be used to facilitate connections between one or more power sources and one or more loads in the same general manner as set forth above.

The switching operations described above for each of the various embodiments may be implemented in a variety of ways. For example, analog control circuitry based on discrete components may be provided. Alternatively, digital control circuitry based on discrete or integrated components, with fixed or programmable logic may also be provided. Alternatively hybrid circuitry incorporating some or all of these variations could also be used. Additionally, the control strategies described are merely exemplary of those typically used in power electronics, and that other various strategies may also be used. Similarly, the switching devices illustrated herein have been assumed to be insulated gate bipolar transistors (IGBTs). However, other types of switching devices, including thyristors, field effect transistors (FETs), or other types may also be used in a given application. Any and all of these variations, in any combination, are intended to fall within the scope of the appended claims.

The control and operation of the described embodiments not necessarily be limited to the sequences described above. For example in a three phase to three phase power conversion the link charging or discharging can occur in either one or two modes during each half link cycle.

The disclosed converters are applicable to a wide variety of systems including but not limited to: Electric Vehicle, Hybrid electric vehicle, photovoltaic, variable frequency drive, HVDC, wind power generation, etc.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A power conversion circuit comprising:
   an input switch bridge stage comprising a plurality of unidirectional conducting and bidirectional blocking switching devices and configured to be coupled to a power source;
   a link stage comprising at least one reactive component of a partially resonant circuit, the partially resonant circuit being configured for AC operation with no DC component;
   an output switch bridge stage comprising a plurality of unidirectional conducting and bidirectional blocking switching devices and configured to be coupled to a load;
   a first crossover switching circuit coupling the input switch bridge stage to the link stage, the crossover switching circuit comprising a bridge of unidirectional conducting and bidirectional blocking switching devices, wherein the first crossover switching circuit is configured to facilitate operation of the switching devices of the input switch bridge stage in cooperation with the AC operation of the link stage; and
   a second crossover switching circuit coupling the link stage to the output switch bridge stage, the crossover switching circuit comprising a bridge of unidirectional conducting and bidirectional blocking switching devices, wherein the second crossover switching circuit is configured to facilitate operation of the switching devices of the output switch bridge stage in cooperation with the AC operation of the link stage.

2. The power conversion circuit of claim 1 wherein the link stage comprises at least one reactive component of a partially resonant parallel L-C circuit.

3. The power conversion circuit of claim 2 wherein the at least one reactive component of the partially resonant parallel L-C circuit comprises an inductor and wherein the partially resonant circuit is formed by inductance of the inductor together with parasitic capacitance of the inductor.

4. The power conversion circuit of claim 2 further comprising a shunt capacitor providing a low-impedance voltage source at one or more of the input and output of the circuit.

5. The power conversion circuit of claim 1 wherein the link stage comprises at least one reactive component of a partially resonant series L-C circuit connected in parallel between the first and second crossover switching circuits.

6. The power conversion circuit of claim 5 wherein the at least one reactive component comprises a capacitor and wherein the partially resonant circuit is formed by capacitance of the capacitor together with parasitic inductance of the capacitor.

7. The power conversion circuit of claim 5 further comprising a series inductor providing a high-impedance current source at one or more of the input and output of the circuit.

8. The power conversion circuit of claim 1 wherein the link stage comprises at least one reactive component of a partially series resonant L-C circuit connected in series between the first and second crossover switching circuits.

9. The power conversion circuit of claim 8 wherein the at least one reactive component comprises a capacitor and wherein the partially resonant circuit is formed by capacitance of the capacitor together with parasitic inductance of the capacitor.

10. The power conversion circuit of claim 8 further comprising a series inductor providing a high-impedance current source at one or more of the input and output of the circuit.

11. The power conversion circuit of claim 1 further comprising an additional crossover switching circuit coupling an additional input switch bridge stage or an additional output switch bridge stage to the link stage, the crossover switching circuit comprising a bridge of unidirectional conducting and bidirectional blocking switching devices and configured to facilitate operation of the switching devices of the additional input or output switch bridge stage in cooperation with the AC operation of the link stage.

12. The power conversion circuit of claim 1 wherein the at least one reactive component comprises a transformer.

13. A power conversion circuit comprising:
an input switch bridge stage comprising a plurality of bidirectional switching devices and configured to be coupled to a power source;
a link stage coupled to the input switch bridge stage and comprising at least one reactive component of a partially resonant series L-C circuit configured for AC operation with no DC component;
an output switch bridge stage comprising a plurality of bidirectional switching devices coupled to the link stage and configured to be coupled to a load;
wherein the bidirectional switching devices of the input switch bridge stage and the output switch bridge stage are configured to facilitate bidirectional operation of the link stage by driving voltage through said at least one reactive component in both directions during each cycle.

14. The power conversion circuit of claim 13 wherein the partially resonant series L-C circuit is connected in parallel with the input switch bridge stage and the output switch bridge stage.

15. The power conversion circuit of claim 13 wherein the partially resonant series L-C circuit is connected in series between the input switch bridge stage and the output switch bridge stage.

16. The power conversion circuit of claim 13 wherein the at least one reactive component of the partially resonant series L-C circuit comprises a capacitor, and wherein a parasitic inductance of the capacitor together with a capacitance of the capacitor form the partially resonant series L-C circuit.

17. The power conversion circuit of claim 13 wherein the at least one reactive component of the partially resonant series L-C circuit comprises a series combination of an inductor and a capacitor.

18. The power conversion circuit of claim 13 further comprising a series inductor providing a high-impedance current source at one or more of the input and output of the circuit.

19. The power conversion circuit of claim 13 wherein the at least one reactive component comprises a transformer.

20. A method of operating a power conversion circuit comprising at least one input stage configured to be coupled to a power source and including a switching bridge, a link stage comprising at least one reactive component of a partially resonant circuit configured for AC operation with no DC component, and at least one output stage configured to be coupled to a load and including a switching bridge, the method comprising:
operating the at least one input stage to charge a reactive component of the partially resonant circuit;
allowing the link stage partially resonant circuit to resonate, wherein the resonant circuit is configured for AC operation with no DC component; and
operating at least the output stage to discharge a reactive component of the partially resonant circuit.

21. A power conversion device comprising:
at least one input means for coupling a power source to the power conversion device;
a link means for transferring energy between an input of the power conversion device and an output of the power conversion device, said link means comprising at least one component of a reactive circuit wherein said reactive circuit is configured for AC operation with no DC component; and
at least one output means for coupling a load to the power conversion device;
wherein said input means and said output means are coupled to said link means.

22. The power conversion device of claim 21 wherein at least one of the input means or at least one of the output means comprises a crossover switching circuit coupling a respective input or output to the link means, the crossover switching circuit comprising a bridge of unidirectional conducting and bidirectional blocking switching devices, wherein the crossover switching circuit is configured to facilitate operation of a corresponding input or output means in cooperation with the AC operation of the link stage.

23. The power conversion device of claim 21 wherein at least one of the input means or at least one of the output means comprises a switch bridge stage including a plurality of bidirectional switching devices configured to be coupled to a power source corresponding to the input means or a load corresponding to an output means, wherein the bidirectional switching devices of the switch bridge stage are configured to facilitate bidirectional operation of the link stage by driving voltage through said at least one reactive component in both directions during each cycle.

* * * * *